(12) United States Patent
Da Torre et al.

(10) Patent No.: US 7,379,740 B2
(45) Date of Patent: *May 27, 2008

(54) METHOD AND SYSTEM FOR THE SIMULATION AND MANAGEMENT OF THE RESOURCES OF A MOBILE TELEPHONE NETWORK

(75) Inventors: Serge Barbosa Da Torre, Paris (FR); Rabih Chrabieh, San Diego, CA (US); Imad Fattouch, Paris (FR)

(73) Assignee: Societe Francaise du Radiotelephone, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/559,701

(22) Filed: Nov. 14, 2006

(65) Prior Publication Data

US 2007/0127490 A1 Jun. 7, 2007

(30) Foreign Application Priority Data

Nov. 14, 2005 (FR) .................................. 05 11509

(51) Int. Cl.
*H04Q 7/36* (2006.01)
(52) U.S. Cl. ...................................... 455/446; 455/445
(58) Field of Classification Search ............. 455/422.1, 455/445, 446
See application file for complete search history.

(56) References Cited

U.S. PATENT DOCUMENTS 5,465,390 A * 11/1995 Cohen .......................... 455/446
5,561,841 A * 10/1996 Markus ......................... 455/446
6,336,035 B1 * 1/2002 Somoza et al. .............. 455/446
6,459,895 B1 * 10/2002 Hastings et al. ............. 455/424
6,539,228 B1 * 3/2003 Tateson ........................ 455/446
6,636,743 B1 * 10/2003 Vicharelli et al. ........ 455/456.1
6,876,856 B2 * 4/2005 Fattouch ....................... 455/446

* cited by examiner

*Primary Examiner*—Harry S Hong

(57) ABSTRACT

This present invention concerns a method and a system for simulating and optimising the use of resources available in a zone of coverage of a mobile telephone network (RT), characterized, firstly, in that it is implemented by processing resources (10) of at least one resource optimization system (1) and, secondly, in that it includes the following stages determination (50), by an event management module (EM) of the optimization system (1), of a variation, called a disruption, of at least one packet (P) transmission (T) required within the network (RT), from at least one statistical distribution map (CR) held in storage resources (11) of the optimization system (1), and that consists of data representing data packet (P) transmissions (T), selection (52) of a set of cells determining a simulated zone (ZS), by a resource operating-resources control module (CL), and then use of a routing algorithm in order to determine a routing path (CP) in the simulated zone (ZS) and to successively optimize the resources of the servers (ER) covering the successive cells of the routing path (CP)

49 Claims, 10 Drawing Sheets

Figure 1:
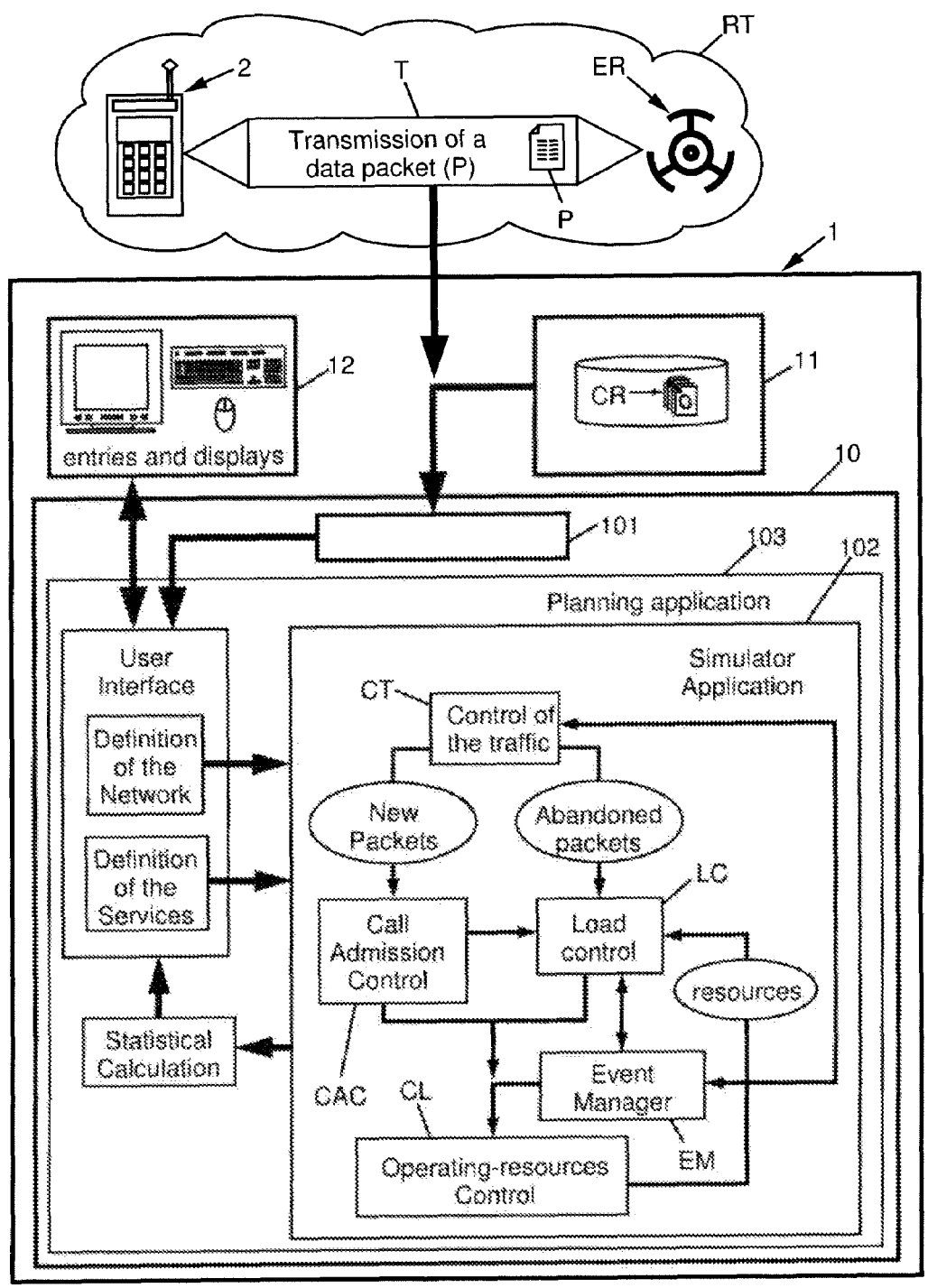

METHOD AND SYSTEM FOR THE SIMULATION AND MANAGEMENT OF THE RESOURCES OF A MOBILE TELEPHONE NETWORK

CROSS-REFERENCE TO RELATED APPLICATIONS

This application claims priority from French Patent Application No. 05 11509 filed Nov. 14, 2005.

This present invention concerns the area of mobile telephony, and in particular the third-generation (3G) mobile telephone networks such as communication systems of the UMTS type (Universal Mobile Telecommunications System), as defined by the 3GPP standard (Third Generation Partnership Project), for example.

A problem that exists in the area of mobile telephony in general is radio resource management (RRM) according to the topology of the networks and their use by the subscribers. In fact, mobile telephone networks require management of the radio resources used, at least in the downlink direction, meaning from the transmitters to the communicating mobile terminals present in their zone of influence. This problem becomes more complex with the development of new telecommunication technologies, and in particular with the arrival of the third-generation systems providing the subscribers with the ability to use their communicating mobile terminals as Internet browser terminals, with a passband (data throughput) of the order of one megabyte per second. In these systems, the transmission rates within a cell of the network vary enormously and rapidly according to the use of the different services by the users. It is therefore important to provide an effective dynamic management of the data throughput transiting via the transmitters for the different communicating mobile terminals present in their zone of influence, and to monitor the quality of the services provided.

In the mobile telephony systems of the GSM generation (global system for mobile communication), the data transmitted by radio are organised into data frames that are divided into a multiplicity of time periods allowing as many users to employ a given frequency in order to communicate through their mobile communication terminal. This division of data frames is called Time Division Multiple Access (TDMA).

In third-generation systems, the data can be transmitted by means of different codings that allow a multiplicity of communicating mobile terminals to use a given radio frequency but with different codes. This technology is called Code Division Multiple Access (CDMA). Modern telephone networks can use both types of division of the radio frequencies for the transmission of data. For example, systems of the UMTS-TDD type (Universal Mobile Telecommunications System-Time Division Duplex) use the TD-CDMA technology (Time Division-Code Division Multiple Access). Certain developments of UMTS, like the WCDMA (Wide-Band Code Division Multiple Access) and HSDPA (High Speed Downlink Packet Access) technologies, allow the achievement of broad passbands for the transmission of data, at least in the downlink direction. Modern mobile telephone networks use the packet-switching (PS) technology, which is that used on the Internet, and by which the data are transmitted in packets, defined as sets of data transiting at the same time, some of which comprise a header used to route, and therefore to address, the packet to its target across the network, of the GPRS type (General Packet Radio Service) for example. Mobile telephone networks also employ the circuit-switching technology for the transit of data corresponding to the audio information that is necessary for telephone communication across the network. Management of the resources of modern mobile telephone networks must therefore not only include management of the division by time of data transmission frames but also of the division by coding, as well as of the routing type (packet switching or circuit switching) used for transiting the packets within the network.

Finally, modern mobile telephone networks require management of the power of the transmitters, not only according to the number of communicating mobile user terminals present in their zone of influence, and according to the distance separating these terminals from the transmitters, but also according to the use of the different types of service, with varying costs in terms of resources, offered by the telephone operators to the users of the communicating mobile terminals.

Some solutions, known from the prior art, allow statistical prediction of the traffic within a network, by means of the Monte Carlo method for example, but these statistical simulation solutions take no account of the temporally dynamic aspect of the communications conveyed within the network, since they are based on iterations of statistical estimates of the traffic at different times. These solutions do not allow call admission control (CAC), meaning control of the acceptance or refusal of the calls according to the use of the transmitter resources. Moreover, neither do these solutions allow load control (LC), meaning control of the use of bearer (B) path frames available for communications within a cell covered by a transmitter. Finally, these solutions do not allow control of the data throughput offered to the different users of communicating terminals present in a cell covered by a transmitter in the network.

Solutions are also known from prior art that consist of dynamic simulation of the communications within a mobile telephone network. These solutions have the advantage of simulating reality, but have the drawbacks of being limited to a set of 30 or 40 cells, since they require a large number of parameters and therefore enormous computing resources. These solutions are therefore too expensive to implement, and are unusable in an operational network.

Solutions are also known, in particular through patent application EP 1 427 233 A1, that consist of simulating the network in which the base stations and the communicating mobile terminals generating interference affecting a particular communication are identified. These solutions have the disadvantages of starting from an unstable state of the network at a given moment, since they consist of searching for possible interference affecting a particular communication from a mobile communication terminal and generated by communications passing through a restricted number of cells around this terminal. This type of solution has the disadvantages of taking no account of the interference generated by the particular communication in the other communications, and of not directly allowing optimisation of the network by means of an effective re-convergence of the network to a stable state.

This present invention has as its objective to remove the drawbacks of the prior art by proposing a method for simulating and optimising the operation of resources in a mobile telephone network, requiring fewer computing capabilities for its implementation and allowing dynamic control, as a function of the traffic, of all the resources of the network and of the use of the various types of service offered to the users of communicating terminals present in the zone of coverage of the network, as well as surveillance of the quality of the services offered.

This objective is reached by a method for simulating and optimising the use of resources available in a zone of coverage of a mobile telephone network consisting of a set of zones of influence, known as cells, a multiplicity of transmitter/receivers, known as servers, whose use of resources depends on the transmission of sets of data, known as packets, required by at least one communicating mobile terminal, called the applicant terminal, present in their zone of influence, characterised firstly in that it is implemented by the processing resources of at least one resource optimisation system and, secondly, in that it includes the following stages:

determination, by an event management module of the optimisation system, of a variation, called a disruption, of at least one packet transmission required within the network, where this disruption is determined from at least one statistical distribution map, held in storage resources of the optimisation system and that consists of data representing data packet transmissions from a multiplicity of the communicating mobile terminals present in given geographical zone during a given time period, selection of a set of cells that consists of at least the cell in which the disruption has occurred, and determination of a simulated zone within the distribution map, by a resource operating-resources control module, and then use of a routing algorithm, by the operating-resources control module, in order to determine a routing path in the simulated zone and to successively optimise the resources of the servers covering the successive cells in the routing path.

According to another particular feature, the method includes a preliminary stage for the establishment of at least one distribution map that consists of data representing the traffic and the location of the servers in the zone of coverage of the network, with these data representing the traffic corresponding to quantitative and qualitative measurements of the location of a multiplicity of communicating mobile terminals and servers operating in the zone of coverage of the network and of the transmission of data packets effected during time periods that have been chosen for their statistical significance, with the data corresponding to these measurements being recorded in the storage resources of the optimisation system.

According to another particular feature, the method includes a stage for the establishment of at least one distribution map that consists of data representing the traffic and location servers in the zone of coverage of the network, with the data representing the traffic being generated by the event management module and representing, firstly, the location of a multiplicity of the communicating mobile terminals distributed randomly in the zone of coverage of the network in a predetermined density and, secondly, the transmission of data packets required by these randomly assigned terminals to the various terminals present in the network, on the basis of random laws held in the storage resources of the optimisation system.

According to another particular feature, the method includes a stage for the recording, in the storage resources of the optimisation system, of at least one routing algorithm that allows the operating-resources control module to determine a routing path consisting of selecting any cell in the simulated zone, and then of a multiplicity of iterations of selecting a cell adjacent to the cell selected previously, until all the cells in the simulated zone have been selected successively in ascending order of their distance in relation to the first cell selected.

According to another particular feature, the method includes a stage for the recording, in the storage resources of the optimisation system, of at least one routing algorithm determining concentric cells centred around the cell in which the disruption has occurred, and that allows the operating-resources control module to determine a routing path consisting of successive selections of the cells in the simulated zone through which these concentric circles pass, in ascending order of the distance of these cells in relation to the first cell selected.

According to another particular feature, the stage for execution of the routing algorithm by the operating-resources control module is accompanied by a stage for the creation of data representing a grid to divide the simulated zone into divisions which each consist of an index obtained from the coordinates of the cells and which are used to locate each of the divisions and to classify them in ascending order of their distance in relation to a central division.

According to another particular feature, the stage for the execution by the operating-resources control module of a routing algorithm results in the determination of concentric cells centred around the cell in which the disruption has occurred, and is accompanied by a stage for the determination of a routing path that consists of at least one vector indicating the path to be followed from one division to the other within the simulated zone, in order to allow successive selections of the divisions in the simulated zone through which these concentric circles pass and successive selections of the cells contained in each of these divisions in ascending order of their distance in relation to a central division.

According to another particular feature, the data representing the grid dividing the simulated zone into divisions include data representing the coordinates of the division that allows the operating-resources control module to determine the location of the cells as well as of the divisions and neighbouring cells.

According to another particular feature, the stage for execution of the routing algorithm by the operating-resources control module is accompanied by a stage for the creation, for each cell in the simulated zone, of data representing the neighbouring cells in the simulated zone, so as to determine a routing path in each of the cells one after the other.

According to another particular feature, the routing path of the cells within a division is determined in a random manner.

According to another particular feature, the stage for execution of the routing algorithm by the operating-resources control module is accompanied by the creation, for each cell in the simulated zone, of data representing a marker indicating the cells already encountered during the journey through the simulated zone by the operating-resources control module.

According to another particular feature, the stage for determination of the disruption consists of a random and automatic selection of a communicating mobile terminal in a distribution map extracted from the storage resources of the optimisation system, and in that the stage for selection of a set of cells determining a simulated zone within the distribution map consists of selecting at least one server whose cell can cover the location at which this terminal is located in the distribution map.

According to another particular feature, the stages for determination of the disruption and for selection of a set of cells determining a simulated zone within the distribution map consist of selecting a communicating mobile terminal present in the zone of coverage of the network and of at least the servers whose cells can cover the location at which this terminal is located in the distribution map, from information entered and recorded by a user resource optimisation system, using interactive resources between the user and the resource optimisation system.

According to another particular feature, firstly, the stage for determination of the disruption is implemented during a request for the transmission of a data packet by an applicant mobile telephone present in the zone of coverage of an operational mobile telephone network, and consists of the location of the applicant communicating mobile terminal in the zone of coverage of the network and identification of the type of transmission that it requires, and secondly, the stage for selection of a set of cells determining a simulated zone within the distribution map consists of selecting at least one server whose cell can cover the location at which this terminal is located in the distribution map.

According to another particular feature, the stage for determination of the disruption by the event management module includes at least one of the following stages:
  a request for a fresh transmission, handled by an event control module,
  the end of a transmission, handled by the event control module,
  the expiry of a transmission timeout, handled by the event control module,
  simulation of the mobility of the communicating mobile terminal responsible for the disruption, handled by a mobility simulation module,
  changing of the current packet transmissions, handled by a packet planning module.

According to another particular feature, the stage for simulating the mobility of the communicating mobile terminal responsible for the disruption consists of one of the following stages:
  modelling of a speed of movement of the communicating mobile terminal by changing the signal-to-noise ratio and modelling the level of losses due to propagation by the adjustment of random variables, or
  changing the location of the communicating mobile terminal in the distribution map by selecting a neighbouring communicating mobile terminal in the map.

According to another particular feature, the method includes a stage for controlling the traffic between the servers in the simulated zone and the communicating mobile terminals present in the simulated zone, executed by a traffic control module of the optimisation system that determines, for each of the current transmissions, sessions for the transmission of packets, transmission bearers, and transmission channels for these packets.

According to another particular feature, the stage for control of the traffic by the traffic control module of the optimisation system consists of determining a multiplicity of parameters relating to the services and to the resources used by the communicating mobile terminals present in the simulated zone, where this determination results from at least one stage for the extraction of data representing these parameters from a distribution map, and/or of a possible stage for the creation of data representing these parameters, from information entered by a user of the optimisation system, so as to allow at least one of the following stages:
  determination of sessions corresponding to the transmission of packets of data between the servers in the simulated zone and each of the communicating mobile terminals present, with determination of the packets transiting during the sessions;
  determination of at least one bearer associated with each of the transmissions of each of the communicating mobile terminals, with determination of at least one parameter from the parameters relating to the type of the bearer, to the speed of the bearer, to the quality of the signal required, to the transmission channels used for each of the cells, and to the range of power levels authorised.

According to another particular feature, the method includes a stage for control of the acceptability of the transmission of this packet, by a call admission control module of the resource optimisation system effecting the determination of a set, called the active set, of cells available within the simulated zone, by a check on the power and the channels available in the simulated zone, and then making a decision, depending on the traffic, of the acceptability of the transmission of this packet over at least one transmission path, known as the bearer, and at least one channel for transmission of the packet via at least one server covering one of the cells of the active set.

According to another particular feature, the method includes a use control stage, executed by an operating-resources control module of the optimisation system during a variation of the number of packets transmitted within the simulated zone and consisting of a check on the power used by the communicating mobile terminals in the cells constituting the simulated zone, and then adjusting the power of at least one server covering at least one cell in the simulated zone.

According to another particular feature, the method includes a load control stage for each of the cells in the simulated zone, executed by a load control module of the optimisation system, during excessive use of the resources of at least one server in the simulated zone, consisting of the use of at least one load control algorithm recorded beforehand in the storage resources of the optimisation system, and that consists of the following stages:
  a check on the resources used, in terms of power and channels, in the cells constituting the simulated zone, in order to select at least one server whose resources are used excessively;
  selection of at least one packet among the packets, called excessive packets, using the maximum of power or using a maximum data throughput in the transmission channels between the communicating mobile terminals present and the server whose resources are used excessively;
  a decision between refusal of the selected excessive packet and downgrading of the transmission parameters of the selected excessive packet.

According to another particular feature, the stage for decision between refusal of the selected excessive packet and downgrading of the transmission parameters of the selected excessive packet, in the course of load control by the load control module, depends on the load control algorithm used and includes the following stages:
  a check on the routing type, by circuit or by packet, used by the selected excessive packet;
  a check on the parameters of the bearer used by the selected excessive packet;
  a check on the type of links established between the mobile communication terminal transmitting the selected excessive packet and its server in the simulated zone, in order to determine whether these links allow automatic switching of the selected excessive packet from one cell to the other in the simulated zone when the power of the signal provided by a server is not sufficient.

According to another particular feature, the stage for downgrading of the transmission parameters of the selected excessive packet includes the following stages:

selection, from among the selected excessive packets, of at least one packet using packet switching and whose links do not allow automatic switching of the packet from one cell to the other, and then a decrease in the value of at least one parameter of the bearer of this packet or iteration of the following stage if no packet satisfies these criteria or if such a decrease is impossible without ending in refusal of this packet;

selection, from among the selected excessive packets, of at least one packet using packet switching and whose links allow automatic switching of the packet from one cell to the other, and then a decision between either iteration of the following stage if no packet satisfies these criteria, or a decrease in the value of at least one parameter of the bearer of this packet, or abandonment of the link used for the automatic switching of this packet, according to a switching control strategy determined in the load control algorithm, or according to whether decreasing the value of at least one parameter of the bearer is impossible;

selection, from among the selected excessive packets, of at least one packet using circuit switching and whose links allow automatic switching of the packet from one cell to the other, and then abandonment of the link used for the automatic switching of this packet or iteration of the following stage if no packet satisfies these criteria;

selection, from among the selected excessive packets, of at least one packet using circuit switching and whose links do not allow automatic switching of the packet from one cell to the other, and then refusal of this packet.

According to another particular feature, the method includes a load control stage for each of the cells in the simulated zone, implemented by a load control module of the optimisation system during a decrease in the use of resources of at least one server in the simulated zone, consisting of the use of at least one load control algorithm recorded beforehand in the storage resources of the optimisation system, and that consists of the following stages:

checking the resources used, in terms of power and channels, in the simulated zone, in order to detect at least one server that has unused resources;

selection of at least one packet from the packets, called disadvantaged packets, using a minimum data throughput over the transmission channels of the server that has unused resources;

upgrading of the transmission parameters of the selected disadvantaged packet, by increasing the value of at least one parameter of the bearer used by this selected disadvantaged packet until a satisfactory operating level is attained, determined in the load control algorithm.

According to another particular feature, the load control stage on each of the cells in the simulated zone is associated with a stage for detection of possible oscillations between two values of at least one parameter of the bearer used by a packet during reconfiguration by the load control module and, where appropriate, the attribution to this parameter of the minimum value reached by the oscillation.

According to another particular feature, the load control stage on each of the cells in the simulated zone is implemented by activation of the load control module by the operating-resources control module, in order to improve the quality of the transmission of the packets of the different communicating mobile terminals present in at least one cell in which the disruption has occurred, determined by the event management module.

According to another particular feature, the load control stage on each of the cells in the simulated zone is implemented by automatic activation of the load control module, when the power required by a packet transmission channel increases beyond an authorised maximum, and consists of automatic selection of this packet as an excessive packet and then downgrading of the transmission parameters of this selected excessive packet.

According to another particular feature, the stage for control of the acceptability of the transmission of the packet of the applicant mobile telephone consists of the use, by the call admission control module, of at least one admission control algorithm recorded beforehand in the storage resources of the optimisation system and includes the following stages:

determination of the active set of cells available for transmission of the packet of the applicant terminal, by measurement and classification of a multiplicity of servers in the simulated zone, whose number depends on the location and the type of the applicant terminal, according to their contribution to the total power of the signals exchanged with the applicant terminal;

checking the availability of resources, in terms of channels and power, for each of the cells;

determination of the power required by the transmission channels of the packet for each of the cells, and checking that this power required by each of the cells does not exceed the maximum power of the bearer determined for the transmission of the packet of the applicant terminal;

checking that the status of at least one of the cells allows the admission of data transmissions by a new mobile communication terminal.

According to another particular feature, the use, by the call admission control module, of at least one admission control algorithm determining the conditions necessary for the admission of a fresh transmission of data, results in a decision, depending on the traffic, concerning the acceptability of the transmission of the packet of the applicant mobile telephone, where this decision consists of one of the following stages:

admission of the transmission of the packet of the applicant terminal, when the conditions necessary for the admission of a fresh transmission are satisfied, after selection of a server for the transmission of the packet, and selection of the bearer to be used for this transmission;

reconfiguration, by the use of at least one reconfiguration algorithm, of the transmission of data when the conditions necessary for the admission of a fresh transmission are not satisfied and when the storage resources of the optimisation system are holding at least one reconfiguration algorithm, in order to allow modification of the data relating to the bearer, and to increase the chances of acceptance of the transmission;

refusal of the transmission of the packet of the applicant mobile telephone, when the conditions necessary for admission are not satisfied and the storage resources of the optimisation system are not storing a reconfiguration algorithm or the traffic within the simulated zone does not allow effective reconfiguration of the transmission of the packet.

According to another particular feature, the stage for reconfiguration, by the use of at least one algorithm for reconfiguration of the transmission of the packet, executed by the call admission control module when the conditions necessary for the admission of a fresh transmission, determined by the admission control algorithm, have not been satisfied, and when the storage resources of the optimisation system are holding at least one reconfiguration algorithm, results either in acceptance of the transmission of the packet by the server of the active set that makes the best contribution to the power of the signal, when the packet is using a circuit-switching technology, and then in a load control stage executed by the load control module, or in at least one of the following stages when the packet is using a packet switching technology:

- a search for a bearer in which the power required is compatible with the range of power of at least one channel of one of the cells of the active set, and then, where appropriate, selection of this bearer and iteration of the following stage, or refusal of the transmission of the packet;
- a check on the availability of the power required by the selected bearer in at least one of the cells of the active set, and then, when these conditions are satisfied, admission of the transmission in this available cell or, when the power required by the bearer is not available, admission of the transmission of the packet by the server of the active set that makes the best contribution to the power of the signal, and then iteration of the load control stage by the load control module.

According to another particular feature, the method is implemented by an application for the simulating and optimising resources, executed on the processing resources of the resource optimisation system, and controlling the processing resources and the interoperability of the traffic control module, of the call admission control module, of the load control module and of the resource operating-resources control module, and accessing the storage resources of the optimisation system in order to load the data necessary for the different modules, where the method includes a stage for installation of the application in the optimisation system by the recording, in the storage resources of the optimisation system, of the data used for the execution of the application on the processing resources of the optimisation system.

According to another particular feature, the stage for installation of the application in the optimisation system includes a stage for the execution of the optimisation application within a software environment provided by a cell planning application executed on the processing resources of at least one server within the zone of coverage of the network, by the recording, in storage resources of the server, of the data used for the execution of the resource optimisation application within the planning application of the server that thus constitutes an optimisation system.

According to another particular feature, the stages for determination of the disruption and for selection of a simulated zone are accompanied by a stage for the loading in a working memory, of the RAM or very fast access type, of the resource optimisation system, of at least some of the data held in the storage resources of the optimisation system.

Another objective of this present invention is to propose a system for simulating and optimising the use of resources in a mobile telephone network, that allows dynamic control, according to the traffic, of all the resources in the network and use of the different types of services offered to the users of communicating terminals present in the zone of coverage of the network, as well as surveillance of the quality of the services offered.

This objective is reached by a system for simulating and optimising the use of resources available in a zone of coverage of a mobile telephone network consisting of a set of zones of influence, known as cells, and a multiplicity of transmitters/receivers, known as servers, whose use of resources depends on the transmission of sets of data, called packets, required by at least one communicating mobile terminal, called the applicant terminal, present in their zone of influence, where the system is characterised in that it includes processing resources that include:

- an event management module determining a variation, called a disruption, of at least one packet transmission required within the network, this disruption being determined from at least one statistical distribution map, held in the storage resources of the optimisation system and consisting of data representing the transmission of data packets of a multiplicity of communicating mobile terminals present in a given geographical zone during a given time period,
- a resource operating-resources control module determining a simulated zone within the distribution map by selecting a set of cells that includes at least the cell in which the disruption has occurred and using a routing algorithm held in the storage resources of the system, in order to determine a routing path in the simulated zone and to successively optimise the resources of the servers covering the successive cells of the routing path.

According to another particular feature, at least one statistical distribution map, held in storage resources, includes data representing the traffic and the location of the servers in the zone of coverage of the network, where these data represent the traffic corresponding to quantitative and qualitative measurements of the location of a multiplicity of the communicating mobile terminals and servers operating in the zone of coverage of the network and of the transmission of data packets effected during time periods that have been chosen for their statistical significance.

According to another particular feature, the storage resources are holding data representing at least one predetermined density of the communicating mobile terminals in the zone of coverage of the network, at least one random distribution law concerning these communicating mobile terminals, and at least one random assignment law concerning the transmission of data packets to these terminals, where all of these data allow the event management module to generate at least one statistical distribution map which consists of data representing the traffic and the location of the servers in the zone of coverage of the network, where the data represents the traffic corresponding, firstly, to the location of a multiplicity of communicating mobile terminals distributed randomly in the zone of coverage of the network according to the predetermined density and, secondly, to the transmission of data packets required by the different terminals present in the network and randomly assigned to these terminals.

According to another particular feature, the storage resources of the optimisation system are holding at least one routing algorithm that allows the operating-resources control module to determine a routing path in the cells, in ascending order of their distance in relation to the first cell selected, according to at least one of the following principles:

selection of any cell in the simulated zone and then iterations of the selection of a cell adjacent to the cell selected previously, until all the cells in the simulated zone have been selected successively, determination of concentric cells, centred around the cell in which the disruption has occurred, and successive selections of the cells in the simulated zone through which these concentric circles pass, creation of data representing a grid to divide the simulated zone into divisions which each consist of an index obtained from the coordinates of the cells and used to locate each of the divisions and to classify them in ascending order of their distance in relation to a central division, and then determination of concentric cells, centred around the cell in which the disruption has occurred, and determination of vectors indicating the path to be followed from one division to the other within the simulated zone, in order to allow successive selections of the divisions in the simulated zone through which these concentric circles pass and successive selections of the cells contained in each of these divisions.

According to another particular feature, the routing algorithm held in the storage resources of the optimisation system, and the grid dividing the simulated zone into divisions, including data representing the coordinates of the division, allow the operating-resources control module to determine the location of the cells as well as of the divisions and the neighbouring cells, and to create, for each cell in the simulated zone, data representing the neighbouring cells in the simulated zone and data representing a marker indicating the cells already encountered during the journey through the simulated zone by the operating-resources control module, so as to determine a routing path in each of the cells one after the other.

According to another particular feature, the routing algorithm held in the storage resources of the optimisation system allows the operating-resources control module to determine a random routing path in the cells within a division.

According to another particular feature, the event management module includes at least one type of selection resources from the following:

random and automatic selection resources of a communicating mobile terminal in a distribution map extracted from the storage resources, selection resources that determine a communicating mobile terminal selected according to information entered and recorded by a user resource optimisation system, by means of interactive resources between the user and the resource optimisation system, operational selection resources of a communicating mobile terminal located automatically in the zone of coverage of an operational mobile telephone network.

According to another particular feature, the event management module includes at least one of the following modules:

an event control module used to determine at least requests for new transmissions, the ending of transmission, and the expiry of transmission timeouts, a mobility simulation module for simulating the mobility of the communicating mobile terminal responsible for the disruption, a packet planning module for managing changes in current packet transmissions.

According to another particular feature, the processing resources include a call admission control module that consists of resources to check the power and the channels available in the simulated zone in order to determine a set, called the active set, of cells available within the simulated zone and to decide, depending on the traffic, on the acceptability of the transmission of the packet of the applicant terminal via at least one transmission path, called the bearer, on at least one channel of at least one server covering one of the cells of the active set.

According to another particular feature, the processing resources include a traffic control module between the servers in the simulated zone and the communicating mobile terminals present in the simulated zone, determining packets transmission sessions, bearers and transmission channels for each of the current transmissions.

According to another particular feature, the operating-resources control module includes resources to check on the power used in each of the cells constituting the simulated zone, and includes resources for adjusting the power of at least one server covering at least one cell in the simulated zone.

According to another particular feature, the processing resources include a load control module which is activated when there is excessive use of the resources of at least one server in the simulated zone and that access the storage resources of the system in order to extract from it at least one load control algorithm, to control the loading on each of the cells in the simulated zone, and that includes decision resources that affect the transmission of the packets by the servers in the simulated zone.

According to another particular feature, the system includes a working memory, of the RAM or very fast access type, in which at least some of the data from among at least the data representing the distribution maps and the routing algorithms are loaded from the storage resources of the system, According to another particular feature, the storage resources of the system are holding data that is used for the execution of an application optimisation resource in the processing resources of the optimisation system, where this application is controlling the processing resources and the interoperability of the traffic control module, the call admission control module, the operating-resources control module and the load control module of the load control.

According to another particular feature, the application is executed within a software environment that is provided by a cell planning application executed on the processing resources of the resource optimisation system.

According to another particular feature, the system is implemented in at least one server covering one cell of the zone of coverage of the network, so as to optimise, in real time, the resources of the server and of the neighbouring servers in the zone of coverage of the network, where this server thus constitutes a system for optimising the resources of the network.

Figure 2:
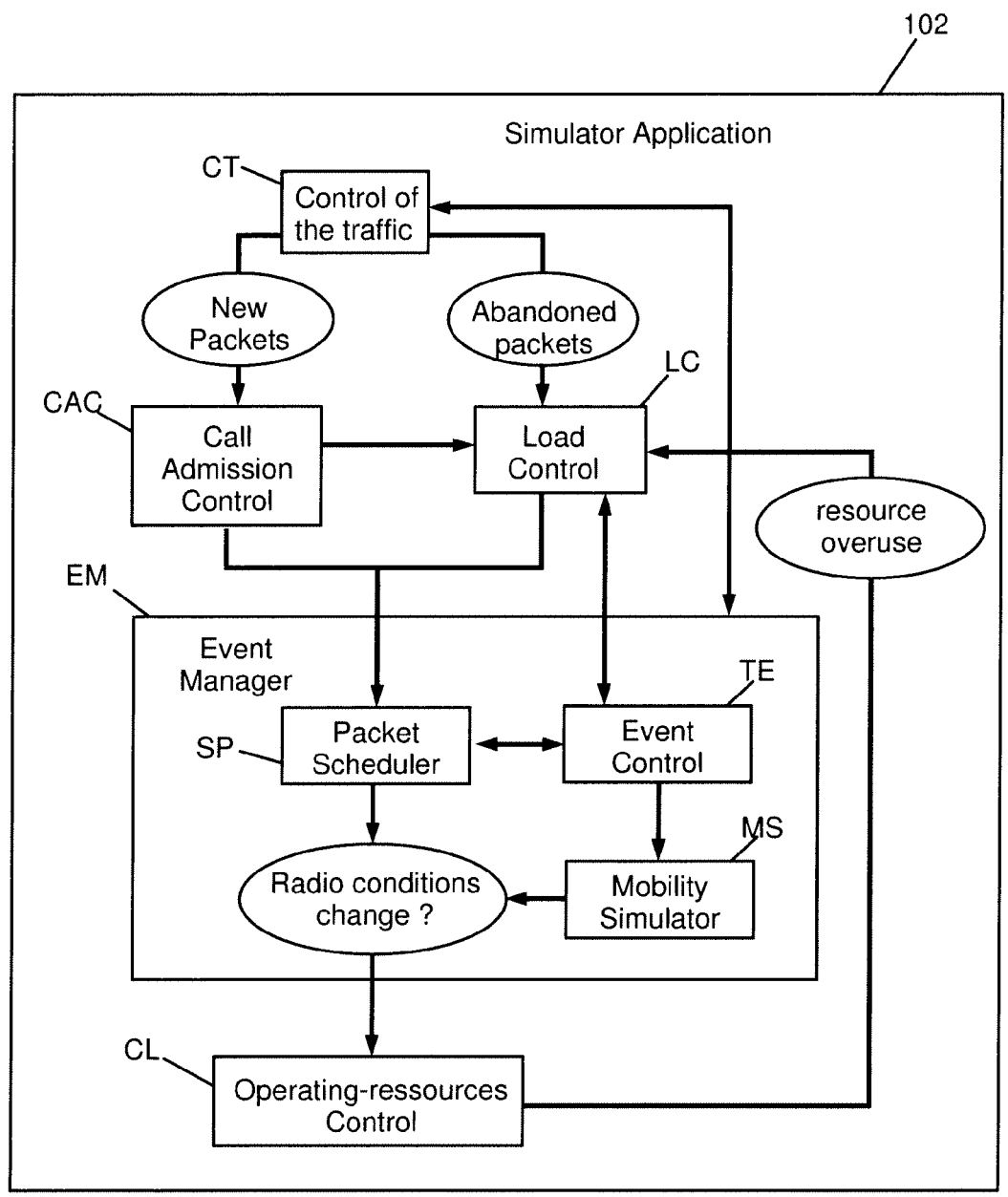
Figure 3:
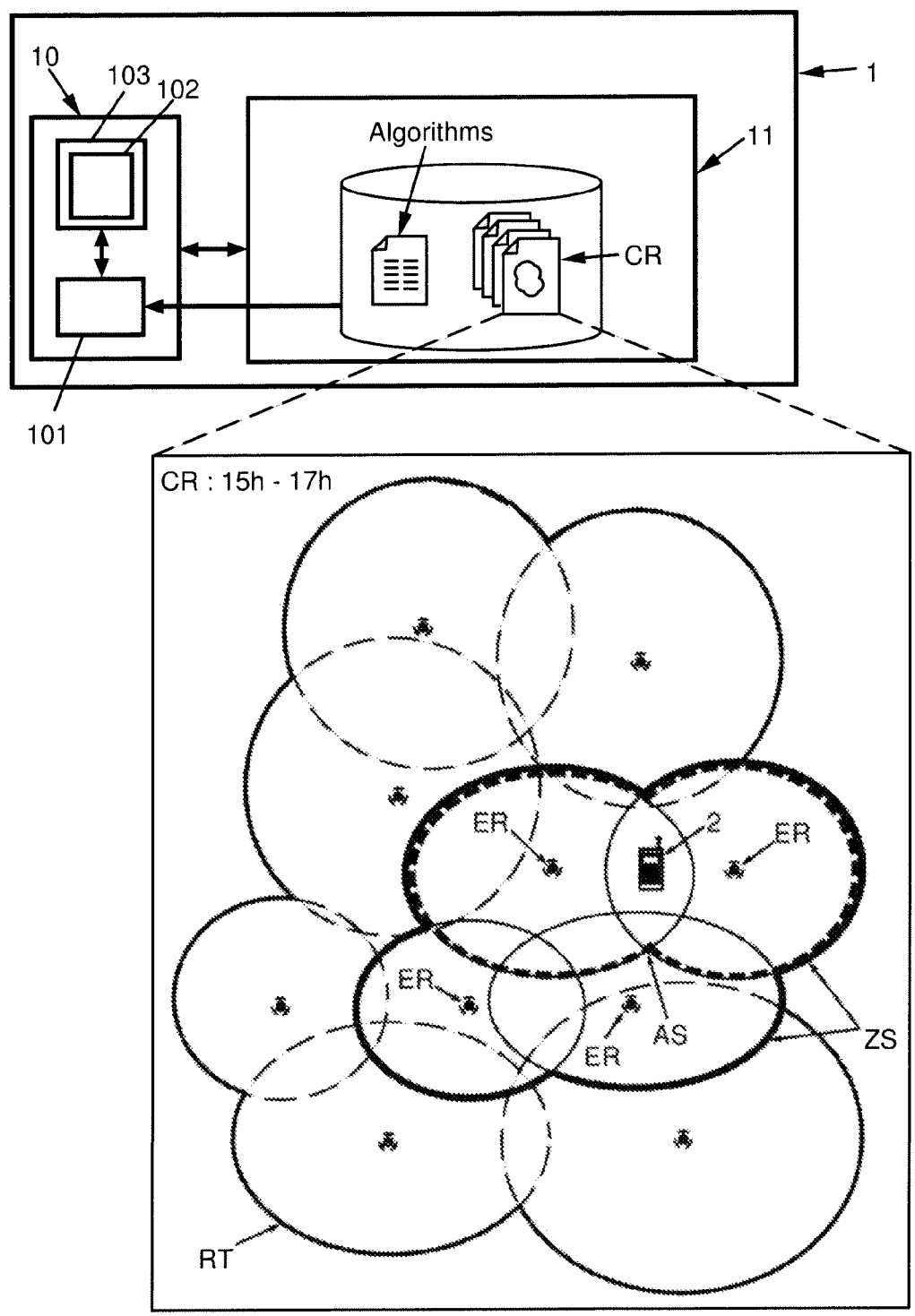
Figure 4:
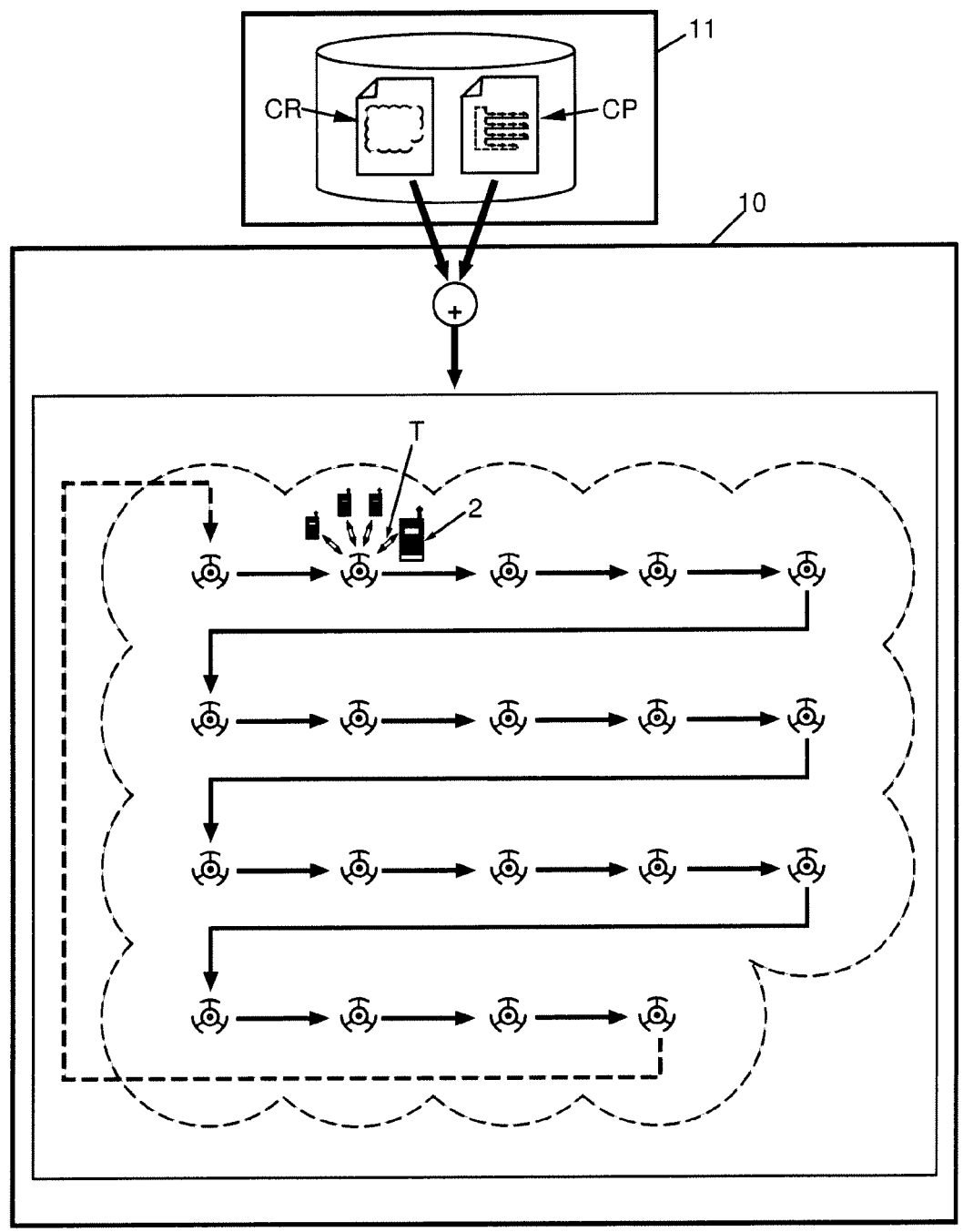
Figure 5A:
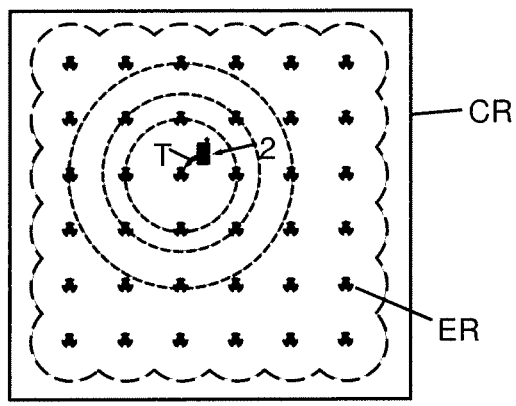
Figure 5B:
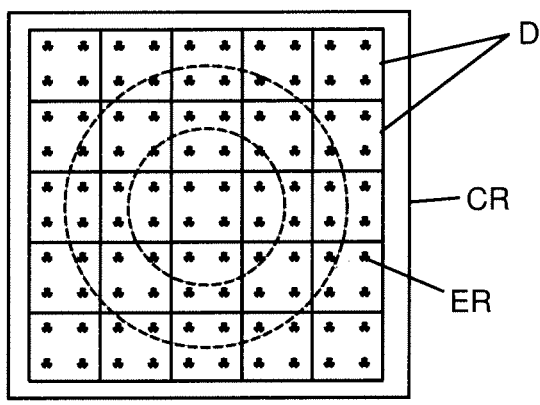
Figure 5C:
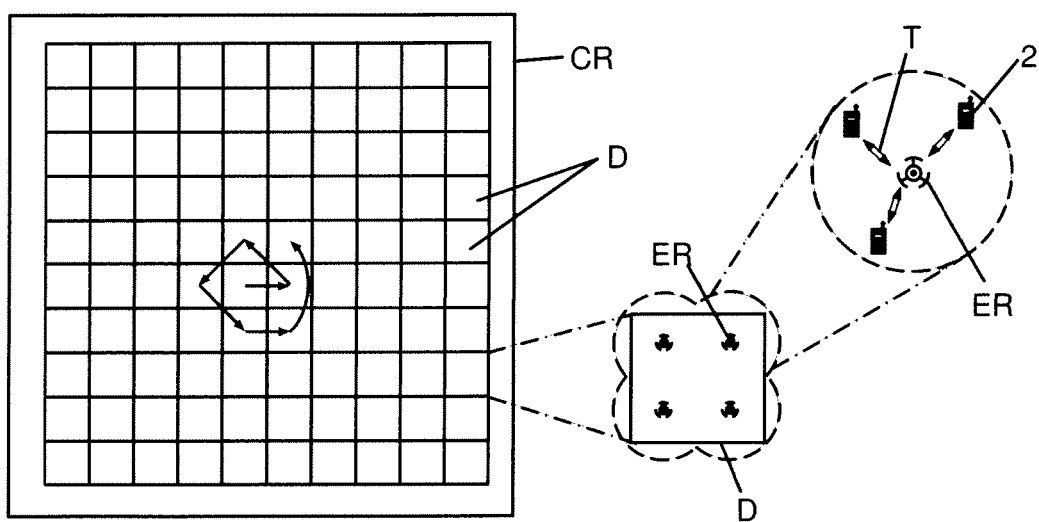
Figure 6:
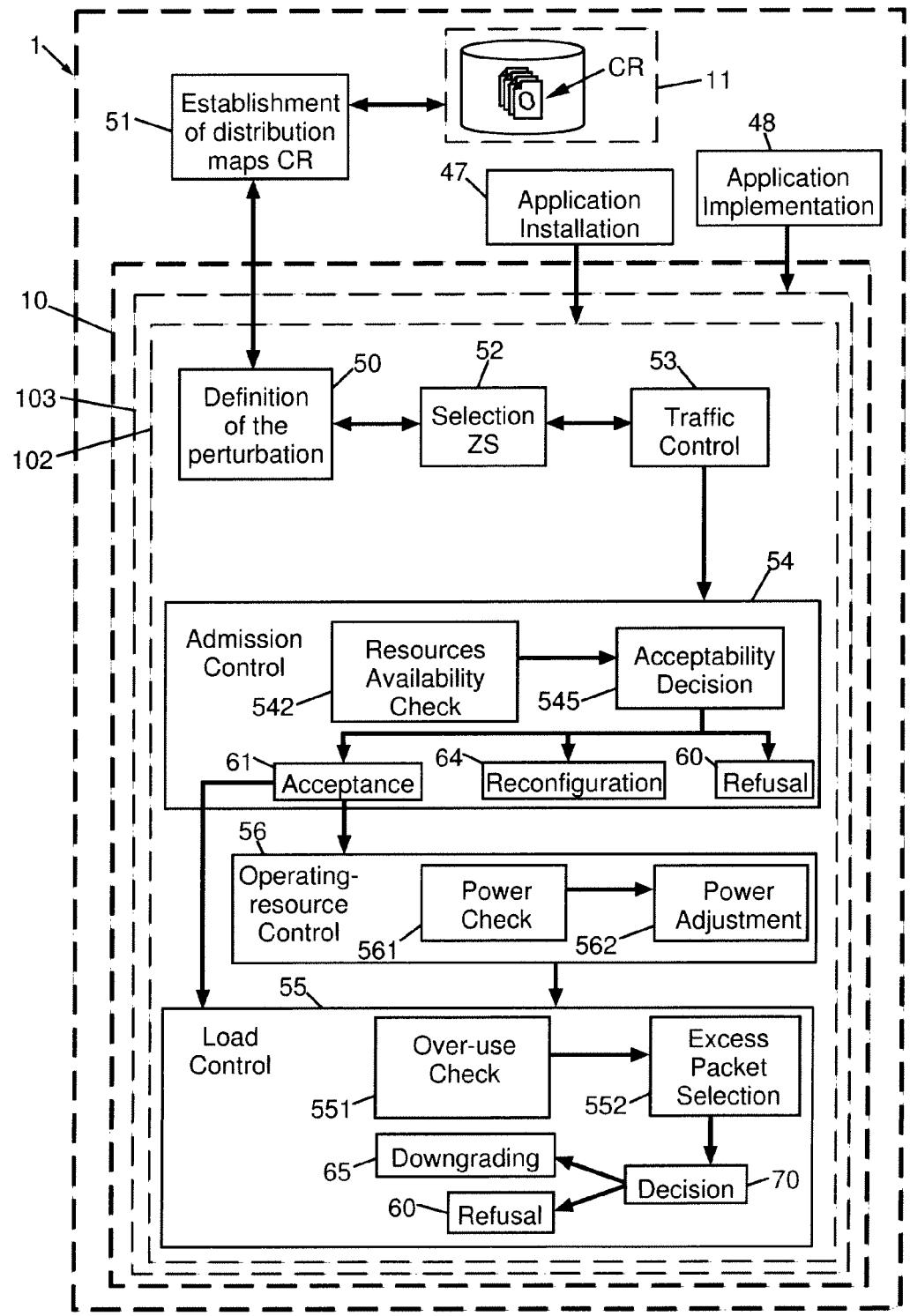
Figure 7:
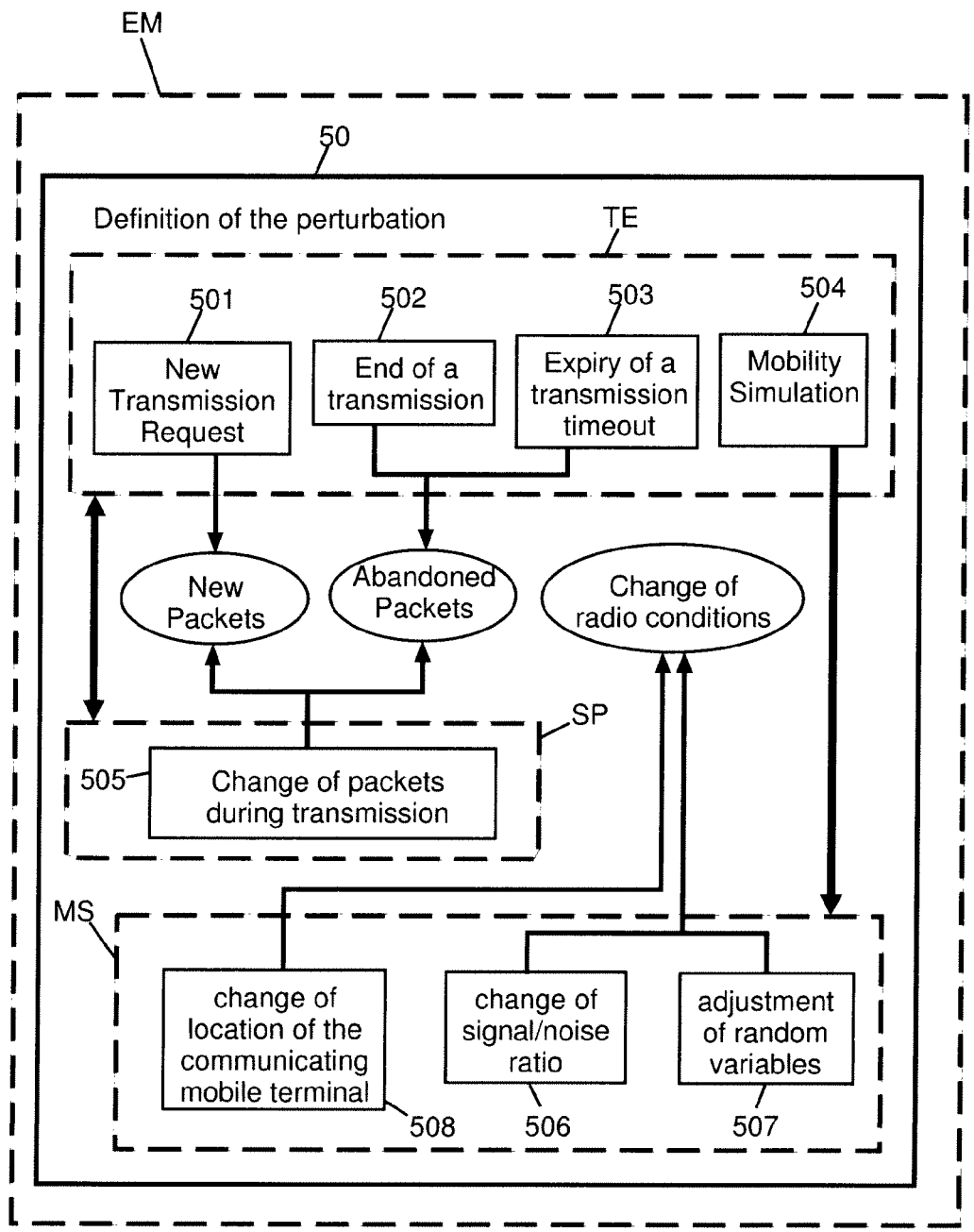
Figure 8:
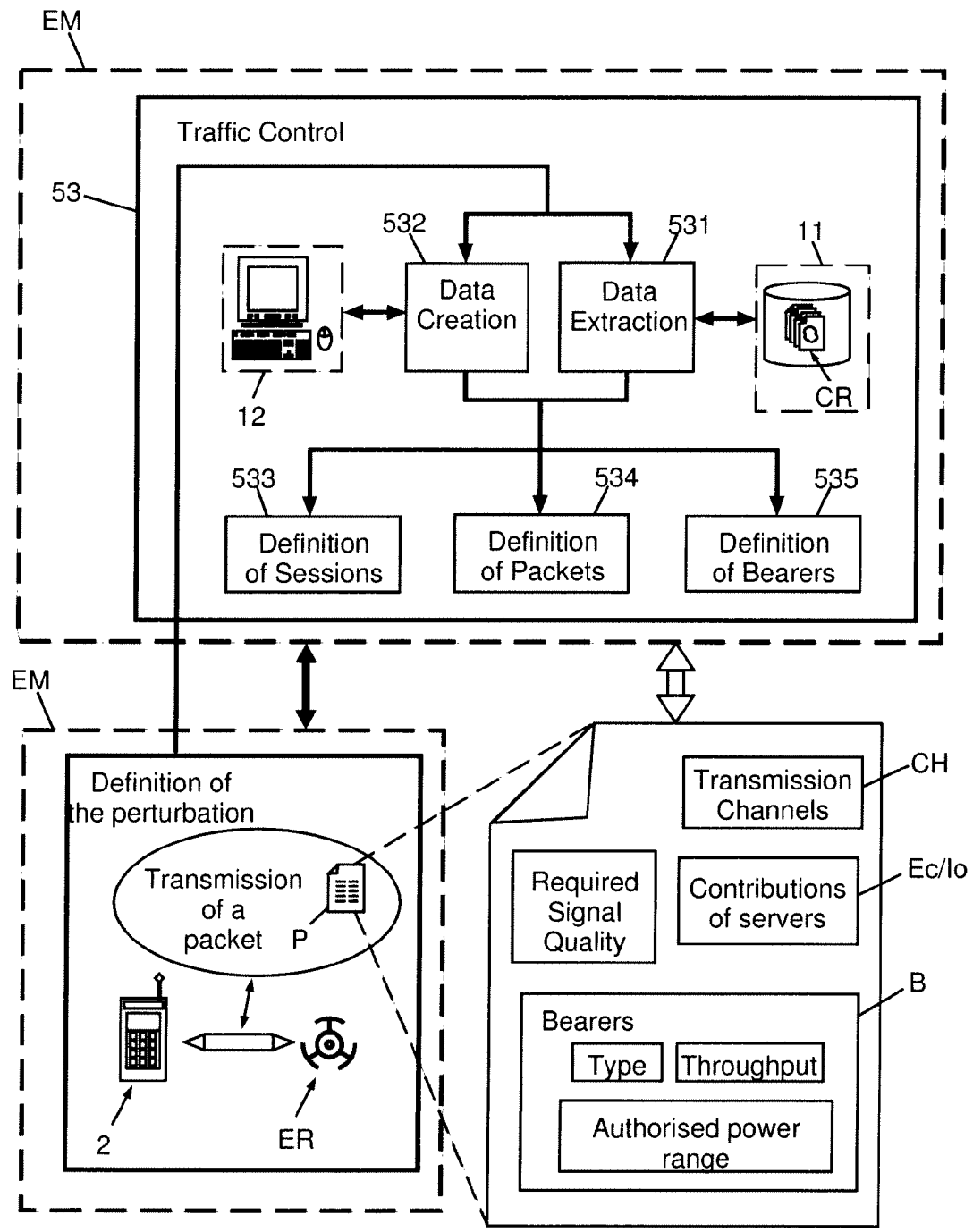
Figure 9:
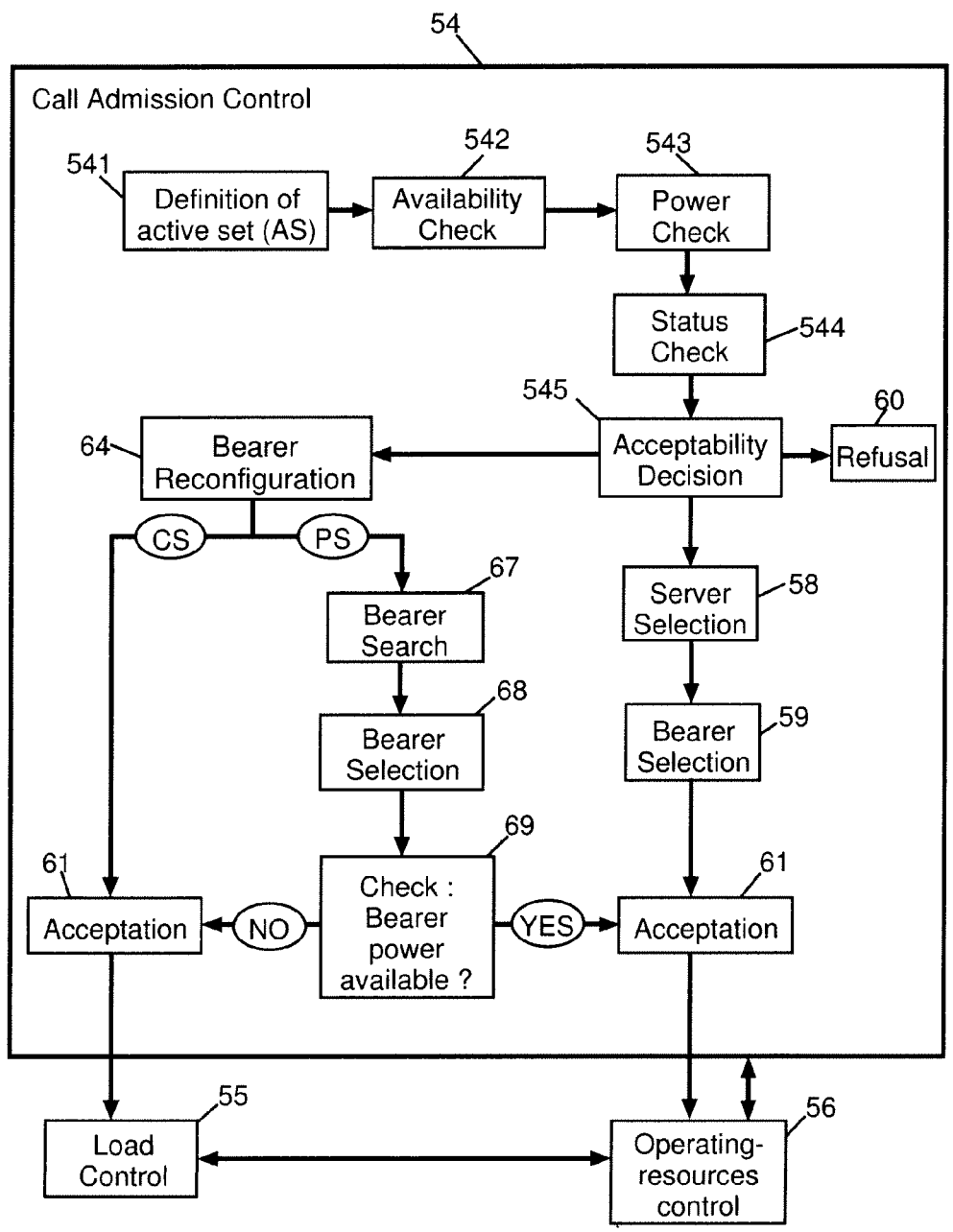
Figure 10:
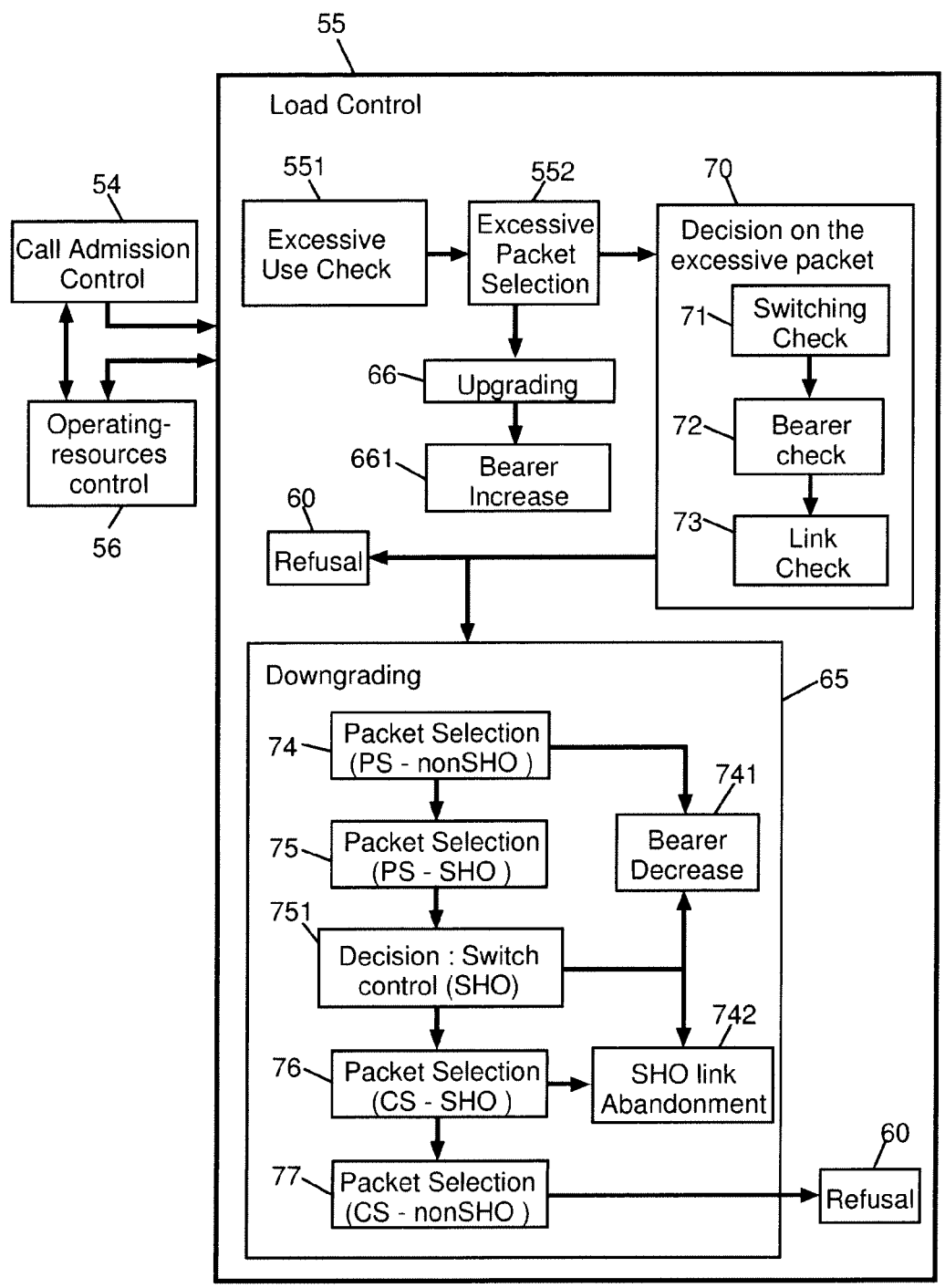

Other particular features and advantages of this present invention will appear more clearly on reading the description that follows, provided with reference to the appended drawings, in which:

FIG. 1 represents one embodiment of the system for simulating and optimising the use of resources in a mobile telephone network, and symbolises its principle of operation, FIG. 2 represents an embodiment of the simulator of the system according to the invention, and in particular details the event management module, FIG. 3 represents an embodiment of the optimisation system, with a detail of a statistical distribution map of the communicating mobile terminals present in the zone of coverage of the network during a given time period, FIG. 4 represents a detail of an embodiment of a routing path applied to a statistical distribution map, to pass through the different servers in the network, FIGS. 5A, 5B and 5C represent a detail of methods of implementation of the routing paths applied to a statistical distribution map, to pass through the different servers in the network, FIG. 6 represents the principal stages of one embodiment of the method according to the invention, FIG. 7 represents the detailed stages employed during the determination of a traffic disruption within the network, according to several possible embodiments of the method according to the invention, FIG. 8 represents the detailed stages employed during control of the traffic within the network, according to one embodiment of the method of the invention, FIG. 9 represents the detailed stages employed during control of the acceptability (admissability) of the transmission of a new packet, according to one embodiment of the method of the invention, FIG. 10 represents the detailed stages employed during control of the loading on the cells making up the mobile telephone network.

This present invention concerns a method and a system (1) for simulating and optimising the operation of transmitter/receiver resources (ER), known as servers, whose zones of influence, known as cells, constitute the zone of coverage of a mobile telephone network (RT). The invention is firstly based on the use of statistical data corresponding to statistical distribution maps (CR) of the traffic and the location of the communicating mobile terminals in the zone of coverage of the network (RT), and secondly on the use of algorithms, determined by the network (RT) managers, to control the decisions made by the optimisation system (1) in order to manage the data transmissions required by the communicating mobile terminals present in the zone of coverage of the network. A simulated network (RT) is therefore shown in the form of data representing statistical distribution maps (CR). The method of the invention therefore includes a preliminary stage for the establishment (51) of a multiplicity of distribution maps (CR). This stage for the establishment (51) of maps (CR) is naturally accompanied by the recording of these maps in the storage resources (11) of the optimisation system (1). The use of these distribution maps (CR) enables the computing capacity necessary for the implementation of the invention to be limited. Moreover, the distribution maps are based upon the transmissions (T) required by the communicating mobile terminals present in the network, and they therefore allow different types of statistical calculations for each of the parameters relating to the transmissions (T) from these communicating mobile terminals.

In a first embodiment, these data representing the maps (CR) can be quantitative and qualitative measurements of the traffic, taken beforehand in a real and operational network by the network (RT) managers, and then recorded in the storage resources (11) of the system (1). The quantitative and qualitative measurements of the traffic, and the location of the communicating mobile terminals, are obtained during time periods that have been chosen for their statistical significance, and the average data obtained are brought together in the statistical distribution maps (CR) of the communicating mobile terminals present in the zone of coverage of the network (RT). These distribution maps (CR), each corresponding to one of the chosen time periods, contain average information concerning the topology of the network (RT), the geographical position of the communicating mobile terminals, and various parameters relating to the operating resources by the communicating mobile terminals during data transmissions.

In a second embodiment, these data, representing maps (CR), can be data generated by the simulator itself using statistical laws created and recorded by the network managers (RT) in the storage resources (11) of the system (1). These statistical laws held in the storage resources (11) can, for example, be data representing at least one predetermined density of the communicating mobile terminals in the zone of coverage of the network (RT), at least one random distribution law of these communicating mobile terminals, and at least one random law for the assignment of the transmissions (T) of data packets (P) to these terminals. All of these data allow an event management module (EM) to generate at least one statistical distribution map (CR) that consists of data representing simulated traffic and the location of the servers (ER) in the zone of coverage of the simulated network (RT). The data representing the traffic then firstly correspond to the location of a multiplicity of communicating mobile terminals distributed randomly (according to the random distribution law) in the zone of coverage of the network (RT) in the predetermined density, and secondly to the transmissions (T) of data packets (P) required by these randomly assigned terminals (according to the random assignment law) to the different terminals present in the network (RT).

In particular, the simulation is based on events managed by an event management module (EM). These events consist of variations, within the network, of the current transmissions (T) of data packets (P). These transmissions (T), with their various parameters detailed below, are managed by the system according to the invention, and constitute traffic within the network, which is in a stable state. Any variation of one of the parameters of the current packet (P) transmissions (T) therefore constitutes a disruption of the stable state in which the network (RT) finds itself. The disruption managed by the event management module (EM) can consist of either a real event, detected in an operational network and reproduced in the simulated network, or of a dummy (virtual) event modelled in the simulated network. The invention then consists of simulating and optimising the operation of resources in the simulated network (RT), but either on the basis of real events detected in an operational network, or on the basis of dummy events modelled in the simulated network. The invention is directed by events disrupting the state of the network and triggering the simulation in order to allow optimisation of the resources and a return to a stable state (simulation of the event-driven type) but it can also include time management (simulation of the time-driven type), by simulating a disruption of the state of the network at the end of predetermined time periods for example.

The optimisation system (1) according to the invention, particularly as shown in FIG. 1, therefore includes an event management module (EM) that is used to determine at least one disruption within the simulated network from a distribution map (CR) extracted from the storage resources (11) of the system (1). This event management module (EM) cooperates with a traffic control module (CT) which is used to determine a certain number of parameters relating to the data transmissions within the network. This disruption, whether real or dummy, activates an operating-resources control module (CL) whose role is to re-establish the stable state of the network by optimising the resources of the cell in which the disruption has occurred, and possibly of the neighbouring cells. The operating-resources control module (CL) determines a simulated zone (ZS) within the distribution map (CR), by selecting a set of cells that includes at least the cell in which the disruption has occurred, and then uses a routing algorithm held in the storage resources (11) of the system (1) in order to determine a routing path (CP) in the simulated zone (ZS) and to successively optimise the resources of the servers (ER) covering the successive cells of the routing path (CP), in ascending order of the distance of these cells in relation to the first cell selected. This operating-resources control module (CL—for Convergence Loop) will then travel through the network, following the determined routing path (CP), looking for cells in which the resources are insufficient. For each cell in which the resources are found to be insufficient, the resource operating-resources control module (CL) will activate at least one of the different modules detailed below in order to cause the resources of the cells to converge back to a stable state. A call admission control module (CAC), using at least one call admission control algorithm, allows a decision to be made concerning the acceptability (admissibility: possibility of admission) of a transmission (T), and a load control module (LC) uses at least one load control algorithm in order to allow reorganisation of the use of resources. The operating-resources control module (CL) also uses at least one power control algorithm to decide on the power to be distributed to the different servers in the network. The application of these different algorithms by the optimisation system (1) allows not only regulation of the number of data transmissions in each of the cells of the network (RT), but also regulation of the use of resources such as the power of the servers and the data throughput used by the communicating mobile terminals present in their zone of influence (cell). A first routing path (CP), particularly as shown in FIG. 4, consists of the selection of any cell in the simulated zone (ZS) and then of a multiplicity of iterations of a procedure for selecting a cell adjacent to the cell selected previously, until all the cells in the simulated zone (ZS) have been selected successively. The stage for execution of the routing algorithm by the operating-resources control module (CL) can be accompanied by a stage for the creation, for each cell in the simulated zone (ZS), of data representing the neighbouring cells in the simulated zone (ZS), so as to determine a routing path (CP) in each of the cells, one after the other. These data can, for example, be loaded at the same time as the data of the distribution map, and they allow the processing of the successive cells to be accelerated. In another embodiment, the routing algorithm used by the operating-resources control module (CL) determines concentric cells, centred around the cell in which the disruption has occurred, as shown in FIG. 5A. The routing path (CP) then determined by the operating-resources control module (CL) will consist of successive selections of the cells in the simulated zone (ZS) through which these concentric circles pass. As shown in FIG. 5B, this routing algorithm can, for example, allow the operating-resources control module (CL) to divide the simulated zone (ZS) into a multiplicity of zones, called divisions, which each consists of at least one cell covered by a server (ER). To this end, the routing algorithm will be used to create a grid in order to divide the simulated zone (ZS) into divisions (D), each of which consists of an index obtained from the coordinates of the cells and used to locate each of the divisions (D) and to classify them in ascending order of their distance in relation to a central division. The divisions (D) in the simulated zone can be of square or hexagonal shaped for example, and the location of the division will be determined by its index, obtained from the coordinates of the cells. Thus, the operating-resources control module (CL) creates data representing divisions (D) in the simulated zone (ZS), and the use of this routing algorithm can be accompanied by a stage for the determination of a routing path (CP) that consists of at least one vector indicating the path to be followed from one division (D) to the other within the simulated zone (ZS), as shown in FIG. 5C. In another embodiment, the journey (run or path) through the cells in the simulated zone (ZS) can also be accompanied by the creation of data representing a marker indicating the cells already encountered during the journey through the simulated zone by the operating-resources control module (CL), when no vector determines the path to be followed in a precise manner. This routing path will allow successive selections of the divisions (D) in the simulated zone (ZS) through which these concentric circles pass, and successive selections of the cells contained in each of these divisions (D). The data representing the grid dividing the simulated zone (ZS) into divisions (D) determined by the operating-resources control module (CL) can consist of data representing the coordinates of the division allowing the operating-resources control module (CL) to determine the location of the cells, as well as of the divisions (D) and the neighbouring cells, in order to facilitate the processing of the cells in the different divisions, in particular in the case where at least some divisions have several cells. In an implementation variant of the routing path, the cells of a division (D) can be selected in a random manner.

The disruption, determined by the event manager (EM), can consist of different events, such as a fresh (a new) transmission (T) for example, or the end of a current transmission (T). The event management module (EM), particularly as shown in FIG. 2, can include different modules that are capable of managing different types of disruption. For example, an event control module (TE) allows the event management module (EM) at least to determine requests for new transmissions (T), the ending of transmission (T) and the expiry of transmission (T) timeouts; a mobility simulation module (MS) allows the event management module (EM) to simulate the mobility of the communicating mobile terminal (2) responsible for the disruption; and a packet planning module (a packet scheduler) (SP) allows the event management module (EM) to manage changes in current packet (P) transmissions (T).

The data representing the distribution maps (CR), and the different algorithms described in this present invention, are held in storage resources (11) of the optimisation system (1), and can therefore be updated easily if necessary. These data, which are necessary for the implementation of the invention, can thus be loaded into the processing resources (10) of the optimisation system (1), such as into a working memory (101) of the RAM or very fast access type. This loading of the data is used to eliminate the time required in order to access the storage resources (11) and, as a consequence, to accelerate the processing of the information. These particular features of the invention facilitate its implementation in an operational network, even if the latter is composed of a large number of cells. For example, the invention can be implemented by an application (102) executed on the processing resources (10) of the optimisation system (1). This application (102) controls the processing resources (10) of the optimisation system (1) and provides interoperability between the event management module (EM), the operating-resources control module (CL), the traffic control module (CT), the call admission control module (CAC) and the load control module (LC). The application (102) accesses the storage resources (11) of the optimisation system (1) in order to load the data necessary for the different modules such as the distribution maps (CR) and the different algorithms. The method according to this embodiment of the invention naturally includes a stage for installation (47) of the application (102) onto the optimisation system (1) by the recording, in the storage resources (11) of the optimisation system (1), of data used for the execution of the application (102) on the processing resources (10) of the optimisation system (1).

In another embodiment of the invention, the optimisation application (102) is implemented directly in the servers (ER) of the network. In a manner which is known by itself, the servers of the mobile telephone networks run a cell planning application (103) on their own processing resources. This cell planning application (103) is used to plan the data transmissions required by the communicating mobile terminals. This cell planning application (103) supplies a software environment in which the application (102) can be implemented. The stage for installation (47) of the application (102) then includes a stage for implementation (48) of the application (102) within this software environment, by the recording, in storage resources of the server (ER), of data used for the execution of the resource optimisation application (102) within the planning application (103). The server running this application (102) therefore then becomes an optimisation system (1) according to the invention.

By optimisation system (1) is therefore meant any computer system equipped with the resources described here, through the execution of the resource optimisation application (102) for example. By mobile communication terminal is meant any mobile terminal that has resources for communication by mobile telephony. Such a terminal can consist of a mobile telephone for example, and in particular a third-generation mobile telephone, but can also be a portable computer or a personal digital assistant (PDA) equipped with resources for communicating by mobile telephony. Any mobile communication terminal present in the zone of coverage of the network (RT) can thus generate a request for the transmission of a data packet (P) and trigger the implementation of the invention. Likewise, the invention allows the simulation of any type of variation in transmission (T) (disruption) within the network, whatever the terminal (real or simulated) responsible for this disruption. The mobile communication terminal sending this request is then called the applicant mobile telephone (2), and the data packet (P) whose transmission it requires must be assessed by the optimisation system (1) in order to decide whether this transmission can be accepted or not, according to the average traffic estimated using the distribution map (CR) corresponding to the time period during which this transmission request occurred.

The invention also includes an embodiment in which the optimisation system (1) consists of a computing system (a computer, for example) on which a user (operator) performs simulations of the traffic according to the distribution maps (CR), in order to test the efficiency of different algorithms using different parameters relating to the traffic and/or different parameters assigned to a packet (P) of an applicant terminal (2) for example. The applicant terminal (2) can be selected by the user or in an automatic and random manner, from the communicating mobile terminals of one of the distribution maps (CR), also selected by the user or in an automatic and random manner. Interactive resources (12) between the user and the optimisation system (1) allow this user to determine all of the data that must be used by the application (102). The user can then select a distribution map (CR) and a mobile communication terminal, or determine the parameters from which these selections must be effected automatically by the system (1), from the statistical laws mentioned previously. The user can also himself determine a completely virtual packet (P) by entering the parameters required for the simulation. He can also select the simulation parameters for which he wishes to make an assessment by statistical calculations or to program several simulations with different parameters and select the simulation parameters for which he wishes to make a comparison. The parameters to be determined, and the results, are presented to the user through the interactive resources (12), such as via a graphical interface of the application (102) or of the planning application (103) for example.

The processing resources (10) of the optimisation system (1) include selection resources that access the storage resources (11) of the system (1) in order to extract from it the statistical distribution map (CR) corresponding to the time period during which the applicant mobile telephone (2) requires the transmission of a packet (P). These selection resources are, for example, implemented in the event management module (EM), and can consist of random and automatic selection resources of a communicating mobile terminal (2) in a distribution map (CR) extracted from the storage resources (11). They can also consist of selection resources that determine a communicating mobile terminal (2) selected according to information entered and recorded by a user resource optimisation system (1), using the interactive resources (12) between the user and the resource optimisation system (1). Finally, these selection resources can consist of operating resources for the selection of a communicating mobile terminal (2) located automatically in the zone of coverage of an operational mobile telephone network (RT). Thus, the optimisation system (1) allows its user to determine whether the position of the applicant terminal (2) must be chosen from the positions of the different communicating mobile terminals of this map, or selected by the user of the system. Moreover, the system is used to determine whether the transmission parameters of the packet (P) from this applicant terminal (2) must either be those of the terminal selected from the map, or parameters determined by the user, or the transmission parameters actually required by the applicant terminal (2) in the case of implementation in an operational network (RT). The selection resources of the system then allow the operating-resources control module (CL) to select, from the extracted map (CR), a set of cells determining a simulated zone (ZS) in which the selected applicant mobile telephone (2) is located.

Thus, according to one embodiment of the method of the invention, the event management module (EM) effects a first stage for determination (50) of a disruption from at least one statistical distribution map (CR) held in storage resources (11) of the optimisation system (1). As explained above, this determination stage is executed in accordance with the operating mode of the system chosen by the network managers. Then, the operating-resources control module executes a stage for the selection (52) of a set of cells determining a simulated zone (ZS) within the statistical distribution map (CR). By way of an example, FIG. 3 symbolised a distribution map (CR) corresponding to a time period of between 15 hours and 17 hours (CR:15 h-17 h), in which the cells covered by the servers (ER) are represented in the form of circles and ellipses. The simulated zone (ZS) is shown in solid bold lines and contains cells that are shown in solid lines. The cells outside the simulated zone (ZS) are shown in fine broken lines, and within the simulated zone, an active set (AS) of cells, to be described in detail later, is shown in bold broken lines. As mentioned previously, the parameters entered by the user of the system (1), in order to determine the simulation and the optimisation to be effected, determine the operating methods according to which the system effects the simulation and in particular the selection (52). This stage for the selection (52) of a simulated zone (ZS) can therefore consist of a random and automatic selection, by the system (1) itself, of a communicating mobile terminal (2) present in the zone of coverage of the network (RT), accompanied by selection of the servers (ER) whose cells can cover the position at which this terminal is located in the distribution map (CR). The user of the system can also determine, in advance, the maximum extent of the simulated zone (ZS), in terms of the number of cells for example. This selection (52) in the simulated zone (ZS) can also be effected by the user of the system (1), and can consist of selecting a communicating mobile terminal (2) present in a distribution map (CR) representing the zone of coverage of the network (RT), accompanied by selecting the neighbouring servers (ER), effected either in an automatic and random manner by the system itself, or by the user if so desired, or automatically according to the location of a communicating mobile terminal (2) that has actually generated a disruption in the operational network. The data representing the quantitative and qualitative measurements contained in the selected map (CR) and corresponding to the traffic within the simulated zone (ZS) are then loaded into the resource optimisation system (1), such as into the working memory (101) for example.

In one embodiment of the invention, the event management module (EM) includes an event control module (TE). This event control module (TE) is used to generate requests for new transmissions (T) or the ending of transmissions (T), due to a mobile communication terminal actually present in the network or simulated by the system according to the invention. This event control module (TE) is also used to manage transmission (T) timeouts that bring about the end of the transmission if the timeouts are exceeded, and are therefore used to determine the expiry of transmission timeouts. Thus, the stage for determination (50) of the disruption by the event management module (EM) can consist, particularly as shown in FIG. 7, of a request (501) for a fresh transmission (T), the end (502) of a transmission (T) and the expiry (503) of a transmission (T) timeout, all three managed by the event control module (TE). The event management module (EM) can also include a packet planning module (SP) that manages the changes in the current packet (P) transmissions (T). This packet planning module (SP) is used to determine the events that trigger the disruption in the network. The stage for determination (50) of the disruption by the event management module (EM) can then consist of a stage for changing (505) the packets (P) during transmission (T), managed by a packet planning module (SP). Finally, the event management module (EM) can also include a mobility simulation module (MS) that allows the simulation of any movement, in the zone of coverage of the network (RT), of a communicating mobile terminal (2) responsible for the disruption. The stage for determination (50) of the disruption by the event management module (EM) can consist of a stage for simulating (504) the mobility of the communicating mobile terminal (2) responsible for the disruption, managed by the mobility simulation module (MS). In one embodiment, this stage for simulating (504) the mobility of the communicating mobile terminal (2) responsible for the disruption can consist of modelling the speed of movement of the communicating mobile terminal (2) by changing (506) the signal-to-noise ratio to allow modelling of the level of losses or of the gain, due to the rapid variations in the strength of the signal (fading) perceived by the communicating mobile terminals (2). This change in the required signal-to-noise ratio can consist, for example, of an adjustment (507) of random variables during the modelling of variations in the strength of the signal (fading). In another embodiment, this stage for simulating (504) the mobility of the communicating mobile terminal (2) can consist of a change (508) in the location of the communicating mobile terminal (2) in the distribution map (CR), by selecting a neighbouring communicating mobile terminal (2) in the map (CR).

The stages for determination (50) of the disruption and for selection (52) in the simulated zone (ZS) are accompanied by a stage for control (53) of the traffic between the servers (ER) in the simulated zone (ZS) and the communicating mobile terminals present in the simulated zone (ZS), implemented by a traffic control module (CT) of the optimisation system (1). This stage for control of the traffic (53), particularly as shown in FIG. 8, consists of determining a multiplicity of parameters relating to the services and to the resources used by the communicating mobile terminals present in the simulated zone (ZS). This determination of the parameters of the current transmissions (T) by the traffic control module (CT) is the result of at least one stage for the extraction (531) of data from a distribution map (CR), in order to extract from it the data representing the transmission parameters of the communicating mobile terminals present in the simulated zone (ZS). According to the operating mode chosen by the user of the optimisation system (1), this determination can also result from a possible stage (532) for the creation of data representing the parameters of the transmission (T) corresponding to the disruption. The parameters relating to packet (P) transmission (T) of (from or to) the applicant mobile telephone (2) can necessitate at least one stage for the creation of data (532), according to the selections of the simulation parameters effected by the user of the optimisation system (1). If the user has himself determined the transmission parameters of the packet (P) of the applicant terminal (2) in order to perform simulation tests in the optimisation system (1), the traffic control module (CT) effects a creation (532) of data representing these transmission parameters of the packet (P) and will incorporate these data into the simulation. If the user has configured the simulation to use the transmission parameters of a mobile communication terminal selected in the distribution map (CR), the traffic control module (CT) effects an extraction (531) of data representing these transmission parameters from the corresponding packet in the distribution map (CR). Finally, if the optimisation system (1) is implemented on a server (ER) of the network, by execution of the application (102) in the planning application (103) of the server (ER), the transmission parameters actually required by the applicant mobile telephone (2) will be used for this stage for the creation of data (532). Thus, the traffic control module (CT) is used to determine, for each of the current transmissions in the simulated zone (ZS), the packet transmission sessions, transmission bearers (B) and transmission channels (CH) required for these packets. The stage for the extraction of data (531) and the possible stage for the creation of data (532), thus allow a stage for the determination (533) of sessions corresponding to data packet transmissions between the servers (ER) in the simulated zone (ZS) and each of the communicating mobile terminals present. This determination of sessions is accompanied by determination (534) of the packets transiting during the sessions. A stage for determination (535) of at least one bearer (B) associated with each of the communicating mobile terminals allows the traffic control module (CT) not only to determine parameters such as the type of the bearer (B), the speed of the bearer (B) and the range of power levels authorised, but also to determine the quality of the signal required for the transmission and the transmission channels (CH) used for each of the cells. The term "bearer" used here refers to a transmission path, and corresponds to all of the parameters used for the transmission of a packet. These different parameters are necessary for the transmission of data between the communicating mobile terminals and the servers (ER) of the mobile telephone network. This present invention advantageously allows these parameters to be controlled, and therefore allows management, possibly in real time, of the use of resources to which these different parameters refer.

When the disruption determined by the event management module (EM) is a request for a fresh transmission (T) by a communicating mobile terminal (2), the call admission control module (CAC), using at least one call admission control algorithm recorded beforehand in the storage resources (11) of the system (1), executes a stage to check (54) the acceptability (possibility of admission or admittance) for transmission of the packet (P) of the applicant mobile telephone (2), according to the traffic in the different cells in the simulated zone. This stage (54), as shown among the main stages shown in FIG. 6, is used to verify (542) the power and the channels available in the simulated zone (ZS). Depending on the traffic, this stage is used to decide (545) between, firstly acceptance (61) of packet (P) transmission (T) if it can be accepted without the need for changes, secondly prior reconfiguration (64) of the parameters of this transmission if it requires configuration changes in order to be eventually accepted, and thirdly refusal (60) of the transmission if it cannot be allowed under any circumstances in the simulated zone (ZS). This acceptance control stage (54), particularly as shown in FIG. 9, consists firstly of the determination (541) of an active set (AS) of cells available within the simulated zone (ZS). This active set (AS) consists of all of the links available within the network (RT) for transmission of the packet (P). An example of an active set (AS) is symbolised by bold broken lines in the distribution map (CR) represented in FIG. 3. In the example of FIG. 3, of the cells in the simulated zone, the active set (AS) includes only the cells of the two servers (ER) closest to the applicant terminal (2), because of the fact, for example, that the other two servers in the simulated zone (ZS) cannot increase their power sufficiently to correctly cover the location of the applicant terminal (2) and offer all of the services normally provided by the network (RT). Determination (541) of the active set (AS) of cells available for transmission (T) of the packet (P) of the applicant terminal (2) is effected by the call admission control module (CAC), by measurement and classification of the servers (ER) in the simulated zone (ZS) according to their contribution (Ec/Io) to the total power of the signals exchanged with the applicant terminal (2). The number of servers (ER) thus selected in the active set (AS) depends not only on the determination stage (50) described previously and therefore on the location of the applicant terminal (2), but also on the type of applicant terminal (2) concerned, since the various known communicating mobile terminals accept lists of servers of varying size for their active set. Once this active set has been determined, the call admission control module (CAC) effects a check (542) on the availability of resources, in terms of channels and power, for each of the cells of this active set (AS). Determination of the power required by the channels for transmission of the packet (P) for each of the cells then allows verification (543) that this power required by each of the cells does not exceed the maximum power of the bearer (B) determined for packet (P) transmission (T) of (from or to) the applicant terminal (2). Then a stage to check (544) that the status of at least one of the cells authorises the acceptance (admission or admittance) of data transmissions by a new mobile communication terminal, allows the call admission control module (CAC) to execute a stage for deciding on (545) the acceptability of transmission of the packet (P) of the applicant mobile telephone (2). As mentioned previously, this decision (545) consists of a choice from three options, depending on the conditions necessary for the acceptance of a fresh transmission, determined in the call admission control algorithm. Acceptance (61) of packet (P) transmission (T) of the applicant terminal (2) will be triggered when the conditions necessary for the acceptance of a fresh transmission are satisfied. This acceptance (61) then requires selection (58) of a server (ER) for packet (P) transmission (T), and the selection (59) of a bearer (B) to be used for this transmission. Reconfiguration (64) of packet (P) transmission (T) will be triggered when the conditions necessary for the acceptance of a fresh transmission are not satisfied. The storage resources (11) of the optimisation system (1) can hold at least one reconfiguration algorithm, used by the call admission control module (CAC) in order to allow modification of the data relating to the bearer (B) of the packet (P), and to increase the chances of acceptance of its transmission. Thus the optimisation system allows equitable sharing of the resources used by the communicating mobile terminals present in the simulated zone (ZS). However, if the traffic within the simulated zone (ZS) does not allow effective reconfiguration (64) of packet (P) transmission (T), then the packet (P) transmission (T) will be refused (60) by the call admission control module (CAC). Likewise, if the storage resources (11) of the optimisation system (1) are not storing a reconfiguration algorithm, or if the user has configured the system (1) so as not to use it, then refusal (60) of packet (P) transmission (T) of the applicant mobile telephone (2) will be triggered automatically as soon as the conditions necessary for acceptance are not satisfied.

The stage for reconfiguration (64) of packet (P) transmission (T), when the conditions necessary for the admission of a fresh transmission, determined by the admission control algorithm, have not been satisfied, consists of the use of at least one reconfiguration algorithm by the call admission control module (CAC). This reconfiguration stage (64) depends on the routing type used for packet (P) transmission (T). If the packet is routed by circuit, meaning that it is of the circuit-switched type, this reconfiguration stage (64) results in the acceptance (61) of packet (P) transmission (T) by the server (ER) of the active set (AS) making the greatest contribution (Ec/Io) to the power of the signal, followed by a load control stage (55) using the load control module (LC). If the packet is routed by packets, meaning that it is of the packet-switched type, then this reconfiguration stage (64) firstly requires a search (67) for a bearer (B) for which the power required is compatible with the range of power of at least one channel (CH) in one of the cells of the active set (AS). If such a bearer (B) is not available, the packet (P) transmission (T) is refused (60). If such a bearer (B) exists in the simulated zone (ZS), the call admission control module (CAC) effects a selection (68) of this bearer (B), and then a check (69) on the availability of the power required by the selected bearer (B) in at least one of the cells of the active set (AS). If these conditions are satisfied, packet (P)

transmission (T) is accepted (61) in the cell of the server that has the required power available. If the power required by the bearer (B) is available in no cell of the active set (AS), then the server (ER) that makes the best contribution (Ec/Io) to the power of the signal is selected in the active set (AS) for the acceptance (61) of packet (P) transmission (T). Following this acceptance (61) of packet (P) transmission (T) in a cell that does not have the power required, the call admission control module (CAC) directly activates the load control module (LC) so that it executes a stage to control (55) the load in the cells (the use of resources in the cells) in the simulated zone (ZS). This load control stage (55) is used to reconfigure the current transmissions in the simulated zone (ZS) and then to execute a power control stage (56) so as to adjust the power levels used on the different servers (ER) in the simulated zone (ZS). Thus, in the event of overuse of resources, the operating-resources control module (CL) will run (make a trip) through the different cells in the simulated zone (ZS) in order to cause the different servers (ER) in the simulated zone (ZS) to converge again to a stable state, by regulating the load on the servers and the power used.

The load control stage (55) of each of the cells in the simulated zone (ZS) can therefore be executed by the load control module (LC) when it is activated directly by the call admission control module (CAC), but in general, the load control module (LC) is activated for any variation in the number of packets (P) transmitted within the simulated zone (ZS). Thus the load control module (LC) can be activated automatically when the use of the resources of a cell is below a minimum threshold or above a maximum threshold. This load control stage (55) is used to improve the transmission quality of packets from the different communicating mobile terminals present in the various cells. For example, the load control module (LC) can be activated by the call admission control module (CAC) in order to adjust the transmissions in the cell in which packet (P) transmission (T) of the applicant mobile telephone (2) has been accepted. The load control module (LC) can also be activated by the operating-resources control module (CL) in order to improve transmission in the cells covered by the servers (ER) whose resources are used excessively, when the operating-resources control module (CL) detects such use, and is unable to adjust it because of the configurations selected for the transmissions of the different packets of the various communicating mobile terminals. The operating-resources control module (CL) of the optimisation system (1) executes a power control stage (56) during a variation in the number of packets transmitted within the simulated zone (ZS). This operating-resources control module (CL) is activated by the call admission control module (CAC) during the acceptance of a fresh transmission of a packet (P) from an applicant terminal (2), or by the load control module (LC) either when the latter has reorganised the transmissions as explained below, following the interruption of a transmission by a mobile communication terminal, or on the abandonment of a packet of a transmission. The power control stage (56) implemented by the operating-resources control module (CL) consists of a check (561) on the power used by the communicating mobile terminals in the cells constituting the simulated zone (ZS), and then an adjustment (562) of the power of at least one server (ER) covering at least one cell in the simulated zone (ZS).

The load control stage (55) in each of the cells in the simulated zone (ZS) can be implemented by automatic activation of the load control module (LC), when the power required by a packet transmission channel (CH) increases beyond an authorised maximum. In this case, this stage (55) consists of an automatic selection (552) of this packet as an excessive packet, and then downgrading (65) of the transmission parameters of this selected excessive packet. In general, the load control stage (55) is executed during excessive use of the resources of at least one server (ER) in the simulated zone (ZS). The load control module (LC) of the optimisation system (1), through the use of at least one load control algorithm recorded beforehand in the storage resources (11) of the optimisation system (1), then performs a check (551) on the resources used, in terms of power and channels, in the cells constituting the simulated zone (ZS), in order to select at least one server (ER) whose resources are used excessively. The packets are determined as excessive when they use the maximum of power available or when they use a maximum data throughput on the transmission channels between the communicating mobile terminals present and the servers (ER). The load control module (LC) then effects a selection (552) of at least one packet from among the excessive packets, and then a decision (70) between refusal (60) of the selected excessive packet and downgrading (65) of the transmission parameters of the selected excessive packet. This decision (70) depends on the load control algorithm used by the load control module (LC) and includes a sequence of preliminary checks used to reorganise the transmission of the packets according to their parameter whose control algorithm is used to establish a priority hierarchy of the different packets. The checks necessary for the decision stage (70) concerning the transmission of the selected excessive packet consists of a check (71) on the routing type, by circuit (CS) or by packet (PS), used by the selected excessive packet, a check (72) on the parameters of the bearer (B) used by the selected excessive packet, and a check (73) on the type of links established between the mobile communication terminal transmitting the selected excessive packet and its server (ER) in the simulated zone (ZS). This check (73) on the type of links established is used to determine whether these links allow automatic switching (SHO) of the selected excessive packet from one cell to the other in the simulated zone (ZS) when the power of the signal provided by a server (ER) is not sufficient.

The stage of downgrading (65) of the transmission parameters of the selected excessive packets includes several stages for the selection of packets according to the order of priority determined in the load control algorithm. The load control module (LC) first searches among the selected excessive packets for at least one packet (PS-non-SHO) using packet switching (PS) and whose links do not allow automatic switching (SHO—soft hand-over) of the packet from one cell to the other. Selection (74) of this packet (PS-non-SHO) allows a decrease (741) in the value of at least one parameter of the bearer (B) of this packet, in order to improve the transmission quality of all of the packets in the simulated zone. If no packet satisfies these criteria, or if such a decrease (741) is impossible without ending in refusal (60) of this packet, then the load control module (LC) effects a selection (75) of at least one packet (PS-SHO) using packet switching (PS) and whose links allow automatic switching (SHO) of the packet from one cell to the other. Then a switching control strategy determined in the load control algorithm allows the load control module (LC) to make a decision (751) between a decrease (741) in the value of at least one parameter of the bearer (B) of this packet and abandonment (742) of the link used for the automatic switching (SHO) of this packet. If no packet (PS-SHO) could be selected at this preceding stage selection (75), the load control module (LC) effects a selection (76) of at least one packet (CS-SHO) using circuit switching (CS) and whose links allow automatic switching (SHO) of the packet from one cell to the other. If such a packet (CS-SHO) is found, the load control module (LC) continues with a stage for abandonment (742) of the link used for the automatic switching (SHO) of this packet (CS-SHO), but if no packet of this type is found, a stage for the selection (77) of at least one packet (CS-non-SHO) using circuit switching (CS) and whose links do not allow automatic switching (SHO) of the packet from one cell to the other, followed by refusal (60) of this packet (CS-non-SHO), allows an improvement in the transmission quality of other packets in the simulated zone (ZS).

As mentioned previously, the load control module (LC) of the optimisation system (1) can be activated automatically during a decrease in the use of the resources of at least one server (ER) in the simulated zone (ZS). The load control stage (55) then includes a stage to check (551) on the resources used, in terms of power and channels, in the simulated zone (ZS), in order to detect at least one server (ER) that has unused resources. Then, from these so-called disadvantaged packets, using a minimum data throughput in the transmission channels of the server (ER) selected as having unused resources, the load control module (LC) effects a selection (552) of at least one packet, followed by an upgrading (66) of the transmission parameters of this disadvantaged packet. This upgrading (66) consists of an increase (661) in the value of at least one parameter of the bearer (B) used by this selected disadvantaged packet, until the attainment of a satisfactory operating level, determined in the load control algorithm. In this embodiment where the load control module (LC) includes an algorithm for increasing the use of resources when they are underused, the load control stage (55) is associated with a stage for detection of possible oscillations between two values of at least one parameter of the bearer (B) used by a packet (P) during reconfiguration by the load control module (LC). In fact, the possible increasing and decreasing of the parameters of the transmission (T) by the load control module (LC) are in opposition, and can give rise to oscillation of this parameter between two values, each leading to one of these two types of regulation. A stage for the detection of oscillation due to these two opposing stages is used to stop the oscillation, by attribution to this parameter of the minimum value reached by the oscillation for example.

It can therefore be seen that the objectives set by the invention, which provides effective control over all of the resources of the telephony network and allows surveillance of the quality of the data transmissions effected by the communicating mobile terminals within the network, have been met. The invention obviously allows the recording of all operations effected, and of the transmissions effected by the various communicating mobile terminals, possibly with a display of the results of simulation and/or of the optimisation resources, such as the average data throughput to the communicating mobile terminals, or the average quality of the signal during the transmissions for example.

It will be obvious to all those who are well-versed in the subject that this present invention allows embodiments in many other specific forms without moving outside the area of application of the invention as claimed. As a consequence, the present embodiments must be considered as provided by way of illustration only, and capable of being modified within the area determined by the scope of the attached claims, and the invention must not be limited to the details provided above.

The invention claimed is:

1. A method for simulating and optimising the use of resources available in a zone of coverage of a mobile telephone network comprising a set of zones of influence, known as cells, a multiplicity of transmitter/receivers, known as servers, whose use of resources depends on the transmission of sets of data, known as packets, required by at least one communicating mobile terminal, called the applicant terminal, present in their zone of influence, wherein:

the method is implemented by the processing resources of at least one resource optimisation system and, the method includes the following:

determining, by an event management module of the optimisation system, of a variation, called a disruption, of at least one packet transmission required within the network, where this disruption is determined from at least one statistical distribution map, held in storage resources of the optimisation system and that comprises data representing data packet transmissions from a multiplicity of the communicating mobile terminals present in given geographical zone during a given time period, and selecting a set of cells that comprises at least the cell in which the disruption has occurred, and determining a simulated zone within the distribution map, by a resource operating-resources control module, and then use of a routing algorithm, by the operating-resources control module, in order to determine a routing path in the simulated zone and to successively optimise the resources of the servers covering the successive cells in the routing path.

2. A method according to claim 1, further including preliminary establishing at least one distribution map that comprises data representing the traffic and the location of the servers in the zone of coverage of the network, with these data representing the traffic corresponding to quantitative and qualitative measurements of the location of a multiplicity of communicating mobile terminals and servers operating in the zone of coverage of the network and of the transmission of data packets effected during time periods that have been chosen for their statistical significance, with the data corresponding to these measurements being recorded in the storage resources of the optimisation system.

3. A method according to claim 1, further including establishing at least one distribution map that comprises data representing the traffic and location servers in the zone of coverage of the network, with the data representing the traffic being generated by the event management module and representing, firstly, the location of a multiplicity of the communicating mobile terminals distributed randomly in the zone of coverage of the network in a predetermined density and, secondly, the transmission of data packets required by these randomly assigned terminals to the various terminals present in the network, on the basis of random laws held in the storage resources of the optimisation system.

4. A method according to claim 1, further including recording, in the storage resources of the optimisation system, of at least one routing algorithm that allows the operating-resources control module to determine a routing path comprising selecting any cell in the simulated zone, and then of a multiplicity of iterations of selecting a cell adjacent to the cell selected previously, until all the cells in the simulated zone have been selected successively in ascending order of their distance in relation to the first cell selected.

5. A method according to claim 1, further including recording, in the storage resources of the optimisation system, of at least one routing algorithm determining concentric cells centred around the cell in which the disruption has occurred, and that allows the operating-resources control module to determine a routing path comprising successive selections of the cells in the simulated zone through which these concentric circles pass, in ascending order of the distance of these cells in relation to the first cell selected.

6. A method according to claim 5, wherein executing the routing algorithm by the operating-resources control module is accompanied by creating data representing a grid to divide the simulated zone into divisions which each comprise an index obtained from the coordinates of the cells and which are used to locate each of the divisions and to classify them in ascending order of their distance in relation to a central division.

7. A method according to claim 6, wherein executing, by the operating-resources control module, a routing algorithm results in determining concentric cells centred around the cell in which the disruption has occurred, and is accompanied by determining a routing path that comprises at least one vector indicating the path to be followed from one division to the other within the simulated zone, in order to allow successive selections of the divisions in the simulated zone through which these concentric circles pass and successive selections of the cells contained in each of these divisions in ascending order of their distance in relation to a central division.

8. A method according to claim 6, wherein the data representing the grid dividing the simulated zone into divisions include data representing the coordinates of the division that allows the operating-resources control module to determine the location of the cells as well as of the divisions and neighbouring cells.

9. A method according to claim 5, wherein executing the routing algorithm, by the operating-resources control module, is accompanied by creating, for each cell in the simulated zone, data representing the neighbouring cells in the simulated zone, so as to determine a routing path in each of the cells one after the other.

10. A method according to claim 9, wherein the routing path of the cells within a division is determined in a random manner.

11. A method according to claim 1, wherein executing the routing algorithm by the operating-resources control module is accompanied by creating, for each cell in the simulated zone, data representing a marker indicating the cells already encountered during the journey through the simulated zone by the operating-resources control module.

12. A method according to claim 1, wherein determining the disruption comprises a random and automatically selecting a communicating mobile terminal in a distribution map extracted from the storage resources of the optimisation system, and wherein selecting a set of cells determining a simulated zone within the distribution map comprises selecting at feast one server whose cell can cover the location at which this terminal is located in the distribution map.

13. A method according to claim 1, wherein determining the disruption and selecting a set of cells determining a simulated zone within the distribution map comprise selecting a communicating mobile terminal present in the zone of coverage of the network and of at least the servers whose cells can cover the location at which this terminal is located in the distribution map, from information entered and recorded by a user resource optimisation system, using interactive resources between the user and the resource optimisation system.

14. A method according to claim 1, wherein, firstly, determining the disruption is implemented during a request for the transmission of a data packet by an applicant mobile telephone present in the zone of coverage of an operational mobile telephone network, and comprises the locating of the applicant communicating mobile terminal in the zone of coverage of the network and identifying the type of transmission that it requires, and, secondly, selecting a set of cells determining a simulated zone within the distribution map comprises selecting at least one server whose cell can cover the location at which this terminal is located in the distribution map.

15. A method according to claim 1, wherein determining the disruption by the event management module includes at least one of the following:
 a request for a fresh transmission, handled by an event control module,
 the end of a transmission, handled by the event control module,
 the expiry of a transmission timeout, handled by the event control module,
 simulation of the mobility of the communicating mobile terminal responsible for the disruption, handled by a mobility simulation module,
 changing of the current packet transmissions, handled by a packet planning module.

16. A method according to claim 15, wherein simulating the mobility of the communicating mobile terminal responsible for the disruption comprises one of the following:
 modelling of a speed of movement of the communicating mobile terminal by changing the signal-to-noise ratio and modelling the level of losses due to propagation by the adjustment of random variables, or
 changing the location of the communicating mobile terminal in the distribution map by selecting a neighbouring communicating mobile terminal in the map.

17. A method according to claim 1, further including controlling the traffic between the servers in the simulated zone and the communicating mobile terminals present in the simulated zone, executed by a traffic control module of the optimisation system that determines, for each of the current transmissions, sessions for the transmission of packets, transmission bearers, and transmission channels for these packets.

18. A method according to claim 17, wherein controlling the traffic, by the traffic control module of the optimisation system, comprises determining a multiplicity of parameters relating to the services and to the resources used by the communicating mobile terminals present in the simulated zone, where this determination results from at least extracting data representing these parameters from a distribution map, and/or possibly creating data representing these parameters, from information entered by a user of the optimisation system, so as to allow at least one of the following:
 determining sessions corresponding to the transmission of packets of data between the servers in the simulated zone and each of the communicating mobile terminals present, with determining the packets transiting during the sessions;
 determining at least one bearer associated with each of the transmissions of each of the communicating mobile terminals, with determining at least one parameter from the parameters relating to the type of the bearer, to the speed of the bearer, to the quality of the signal required, to the transmission channels used for each of the cells, and to the range of power levels authorised.

19. A method according to claim 1, further including controlling the acceptability of the transmission of this packet, by a call admission control module of the resource optimisation system determining a set, called the active set, of cells available within the simulated zone, by a check on the power and the channels available in the simulated zone, and then making a decision, depending on the traffic, of the acceptability of the transmission of this packet over at least one transmission path, known as the bearer, and at least one channel for transmission of the packet via at least one server covering one of the cells of the active set.

20. A method according to claim 1, further including controlling, by an operating-resources control module of the optimisation system, the resources used during a variation of the number of packets transmitted within the simulated zone and comprising checking the power used by the communicating mobile terminals in the cells of the simulated zone, and then adjusting the power of at least one server covering at least one cell in the simulated zone.

21. A method according to claim 1, further including controlling the load for each of the cells in the simulated zone, executed by a load control module of the optimisation system, during excessive use of the resources of at least one server in the simulated zone, comprising the use of at least one load control algorithm recorded beforehand in the storage resources of the optimisation system, and that comprises the following:
    checking the resources used, in terms of power and channels, in the cells of the simulated zone, in order to select at least one server whose resources are used excessively;
    selecting at least one packet among the packets, called excessive packets, using the maximum of power or using a maximum data throughput in the transmission channels between the communicating mobile terminals present and the server whose resources are used excessively; and
    deciding between refusal of the selected excessive packet and downgrading of the transmission parameters of the selected excessive packet.

22. A method according to claim 21, wherein deciding between refusal of the selected excessive packet and downgrading of the transmission parameters of the selected excessive packet, in the course of load control by the load control module, depends on the load control algorithm used and comprises at least the following:
    checking the routing type, by circuit or by packet, used by the selected excessive packet;
    checking the parameters of the bearer used by the selected excessive packet; and
    checking the type of links established between the mobile communication terminal transmitting the selected excessive packet and its server in the simulated zone, in order to determine whether these links allow automatic switching of the selected excessive packet from one cell to the other in the simulated zone when the power of the signal provided by a server is not sufficient.

23. A method according to claim 22, wherein downgrading the transmission parameters of the selected excessive packet includes at least the following:
    selecting, from among the selected excessive packets, at least one packet using packet switching and whose links do not allow automatic switching of the packet from one cell to the other, and then decreasing the value of at least one parameter of the bearer of this packet or iterating the following if no packet satisfies these criteria or if such a decrease is impossible without ending in refusing this packet;
    selecting, from among the selected excessive packets, at least one packet using packet switching and whose links allow automatic switching of the packet from one cell to the other, and then deciding between either iteration of the following if no packet satisfies these criteria, or decreasing the value of at least one parameter of the bearer of this packet, or abandoning the link used for the automatic switching of this packet, according to a switching control strategy determined in the load control algorithm, or according to whether decreasing the value of at least one parameter of the bearer is impossible;
    selecting, from among the selected excessive packets, at least one packet using circuit switching and whose links allow automatic switching of the packet from one cell to the other, and then abandoning the link used for the automatic switching of this packet or iteration of the following if no packet satisfies these criteria; and
    selecting, from among the selected excessive packets, at least one packet using circuit switching and whose links do not allow automatic switching of the packet from one cell to the other, and then refusing this packet.

24. A method according to claim 1, further including controlling the load for each of the cells in the simulated zone, implemented by a load control module of the optimisation system during a decrease in the use of resources of at least one server in the simulated zone, comprising using at least one load control algorithm recorded beforehand in the storage resources of the optimisation system, and that comprises at least the following:
    checking the resources used, in terms of power and channels, in the simulated zone, in order to detect at least one server that has unused resources;
    selecting at least one packet from the packets, called disadvantaged packets, using a minimum data throughput over the transmission channels of the server that has unused resources; and
    upgrading the transmission parameters of the selected disadvantaged packet, by increasing the value of at least one parameter of the bearer used by this selected disadvantaged packet until a satisfactory operating level is attained, determined in the load control algorithm.

25. A method according to claim 24, wherein controlling the load on each of the cells in the simulated zone is associated with detecting possible oscillations between two values of at least one parameter of the bearer used by a packet during reconfiguration by the load control module and, where appropriate, attributing, to this parameter, the minimum value reached by the oscillation.

26. A method according to claim 21, wherein controlling the load on each of the cells in the simulated zone is implemented by activating the load control module by the operating-resources control module, in order to improve the quality of the transmission of the packets of the different communicating mobile terminals present in at least one cell in which the disruption has occurred, determined by the event management module.

27. A method according to claim 21, wherein controlling the load on each of the cells in the simulated zone is implemented by automatically activating the load control module, when the power required by a packet transmission channel increases beyond an authorised maximum, and comprises automatically selecting this packet as an excessive packet and then downgrading the transmission parameters of this selected excessive packet.

28. A method according to claim 19, wherein controlling the acceptability of the transmission of the packet of the applicant mobile telephone comprises using, by the call admission control module, at least one admission control algorithm recorded beforehand in the storage resources of the optimisation system and includes at least the following:

determining the active set of cells available for transmission of the packet of the applicant terminal, by measuring and classifying a multiplicity of servers in the simulated zone, whose number depends on the location and the type of the applicant terminal, according to their contribution to the total power of the signals exchanged with the applicant terminal;

checking the availability of resources, in terms of channels and power, for each of the cells;

determining the power required by the transmission channels of the packet for each of the cells, and checking that this power required by each of the cells does not exceed the maximum power of the bearer determined for the transmission of the packet of the applicant terminal; and checking that the status of at least one of the cells allows the admission of data transmissions by a new mobile communication terminal.

29. A method according to claim 28, wherein using, by the call admission control module, at least one admission control algorithm determining the conditions necessary for the admission of a fresh transmission of data, results in deciding, depending on the traffic, about the acceptability of the transmission of the packet of the applicant mobile telephone, where this deciding comprises one of the following:

admitting the transmission of the packet of the applicant terminal, when the conditions necessary for the admission of a fresh transmission are satisfied, after selecting a server for the transmission of the packet, and selecting the bearer to be used for this transmission;

reconfiguring, by using at least one reconfiguration algorithm, the transmission of data when the conditions necessary for the admission of a fresh transmission are not satisfied and when the storage resources of the optimisation system are holding at least one reconfiguration algorithm, in order to allow modifying the data relating to the bearer, and to increase the chances of acceptance of the transmission;

refusing the transmission of the packet of the applicant mobile telephone, when the conditions necessary for admission are not satisfied and the storage resources of the optimisation system are not storing a reconfiguration algorithm or the traffic within the simulated zone does not allow effective reconfiguration of the transmission of the packet.

30. A method according to claim 29, wherein reconfiguring, by the use of at least one algorithm for reconfiguration, the transmission of the packet, executed by the call admission control module when the conditions necessary for the admission of a fresh transmission, determined by the admission control algorithm, have not been satisfied, and when the storage resources of the optimisation system are holding at least one reconfiguration algorithm, results either in accepting the transmission of the packet by the server of the active set that makes the best contribution to the power of the signal, when the packet is using a circuit-switching technology, and then controlling the toad, executed by the load control module, or in at least one of the following when the packet is using a packet switching technology:

searching for a bearer in which the power required is compatible with the range of power of at least one channel of one of the cells of the active set, and then, where appropriate, selecting this bearer and iterating the following, or refusing the transmission of the packet;

checking the availability of the power required by the selected bearer in at least one of the cells of the active set, and then, when these conditions are satisfied, admitting the transmission in this available cell or, when the power required by the bearer is not available, admitting the transmission of the packet by the server of the active set that makes the best contribution to the power of the signal, and then controlling the load by the load control module.

31. A method according to claim 1, further implemented by an application for the simulating and optimising resources, executed on the processing resources of the resource optimisation system, and controlling the processing resources and the interoperability of the traffic control module, of the call admission control module, of the load control module and of the resource operating-resources control module, and accessing the storage resources of the optimisation system in order to load the data necessary for the different modules, where the method includes installing the application in the optimisation system by the recording, in the storage resources of the optimisation system, of the data used for the execution of the application on the processing resources of the optimisation system.

32. A method according to claim 31, wherein installing the application in the optimisation system includes executing the optimisation application within a software environment provided by a cell planning application executed on the processing resources of at least one server within the zone of coverage of the network, by the recording, in storage resources of the server, of the data used for executing the resource optimisation application within the planning application of the server that thus constitutes an optimisation system.

33. A method according to claim 1, wherein determining the disruption and selecting a simulated zone are accompanied by loading in a working memory, of the RAM or very fast access type, of the resource optimisation system, of at least some of the data held in the storage resources of the optimisation system.

34. A system for simulating and optimising the use of resources available in a zone of coverage of a mobile telephone network comprising a set of zones of influence, known as cells, and a multiplicity of transmitters/receivers, known as servers, whose use of resources depends on the transmission of sets of data, called packets, required by at least one communicating mobile terminal, called the applicant terminal, present in their zone of influence, where the system includes processing resources that comprise:

an event management module determining a variation, called a disruption, of at least one packet transmission required within the network, this disruption being determined from at least one statistical distribution map, held in the storage resources of the optimisation system and comprising data representing the transmission of data packets of a multiplicity of communicating mobile terminals present in a given geographical zone during a given time period, and a resource operating-resources control module determining a simulated zone within the distribution map by selecting a set of cells that includes at least the cell in which the disruption has occurred and using a routing algorithm held in the storage resources of the system, in order to determine a routing path in the simulated zone and to successively optimise the resources of the servers covering the successive cells of the routing path.

35. A system according to claim 34, wherein at least one statistical distribution map, held in storage resources, includes data representing the traffic and the location of the servers in the zone of coverage of the network, where these data represent the traffic corresponding to quantitative and qualitative measurements of the location of a multiplicity of the communicating mobile terminals and servers operating in the zone of coverage of the network and of the transmission of data packets effected during time periods that have been chosen for their statistical significance.

36. A system according to claim 34, wherein the storage resources are holding data representing at least one predetermined density of the communicating mobile terminals in the zone of coverage of the network, at least one random distribution law concerning these communicating mobile terminals, and at least one random assignment law concerning the transmission of data packets to these terminals, where all of these data allow the event management module to generate at least one statistical distribution map which comprises data representing the traffic and the location of the servers in the zone of coverage of the network, where the data represents the traffic corresponding, firstly, to the location of a multiplicity of communicating mobile terminals distributed randomly in the zone of coverage of the network according to the predetermined density and, secondly, to the transmission of data packets required by the different terminals present in the network and randomly assigned to these terminals.

37. A system according to claim 34, wherein the storage resources of the optimisation system are holding at least one routing algorithm that allows the operating-resources control module to determine a routing path in the cells, in ascending order of their distance in relation to the first cell selected, according to at least one of the following principles:
   selection of any cell in the simulated zone and then iterations of the selection of a cell adjacent to the cell selected previously, until all the cells in the simulated zone have been selected successively,
   determination of concentric cells, centred around the cell in which the disruption has occurred, and successive selections of the cells in the simulated zone through which these concentric circles pass,
   creation of data representing a grid to divide the simulated zone into divisions which each consist of an index obtained from the coordinates of the cells and used to locate each of the divisions and to classify them in ascending order of their distance in relation to a central division, and then determination of concentric cells, centred around the cell in which the disruption has occurred, and determination of vectors indicating the path to be followed from one division to the other within the simulated zone, in order to allow successive selections of the divisions in the simulated zone through which these concentric circles pass and successive selections of the cells contained in each of these divisions.

38. A system according to claim 34, wherein the routing algorithm held in the storage resources of the optimisation system, and the grid dividing the simulated zone into divisions, including data representing the coordinates of the division, allow the operating-resources control module to determine the location of the cells as well as of the divisions and the neighbouring cells, and to create, for each cell in the simulated zone, data representing the neighbouring cells in the simulated zone and data representing a marker indicating the cells already encountered during the journey through the simulated zone by the operating-resources control module, so as to determine a routing path in each of the cells one after the other.

39. A system according to claim 34, wherein the routing algorithm held in the storage resources of the optimisation system allows the operating-resources control module to determine a random routing path in the cells within a division.

40. A system according to claim 34, wherein the event management module includes at least one type of selection resources from the following:
   random and automatic selection resources of a communicating mobile terminal in a distribution map extracted from the storage resources,
   selection resources that determine a communicating mobile terminal selected according to information entered and recorded by a user resource optimisation system, by means of interactive resources between the user and the resource optimisation system,
   operational selection resources of a communicating mobile terminal located automatically in the zone of coverage of an operational mobile telephone network.

41. A system according to claim 34, wherein the event management module includes at least one of the following modules:
   an event control module used to determine at least requests for new transmissions, the ending of transmission, and the expiry of transmission timeouts,
   a mobility simulation module for simulating the mobility of the communicating mobile terminal responsible for the disruption,
   a packet planning module for managing changes in current packet transmissions.

42. A system according to claim 34, wherein the processing resources include a call admission control module that comprises resources to check the power and the channels available in the simulated zone in order to determine a set, called the active set, of cells available within the simulated zone and to decide, depending on the traffic, on the acceptability of the transmission of the packet of the applicant terminal via at least one transmission path, called the bearer, on at least one channel of at least one server covering one of the cells of the active set.

43. A system according to claim 34, wherein the processing resources include a traffic control module between the servers in the simulated zone and the communicating mobile terminals present in the simulated zone, determining packets transmission sessions, bearers and transmission channels for each of the current transmissions.

44. A system according to claim 34, wherein the operating-resources control module includes resources to check on the power used in each of the cells constituting the simulated zone, and includes resources for adjusting the power of at least one server covering at least one cell in the simulated zone.

45. A system according to claim 34, wherein the processing resources include a load control module which is activated when there is excessive use of the resources of at least one server in the simulated zone and that accesses the storage resources of the system in order to extract from it at least one load control algorithm, to control the loading on each of the cells in the simulated zone, and that includes decision resources that affect the transmission of the packets by the servers in the simulated zone.

46. A system according to claim 34, further including a working memory, of the RAM or very fast access type, in which at least some of the data from among at least the data representing the distribution maps and the routing algorithms are loaded from the storage resources of the system.

47. A system according to claim 34, wherein the storage resources of the system are holding data that is used for the execution of an resource optimisation application in the processing resources of the optimisation system, where this application is controlling the processing resources and the interoperability of the traffic control module, the call admission control module, the operating-resources control module and the load control module of the load control.

48. A system according to claim 47, wherein the application is executed within a software environment that is provided by a cell planning application executed on the processing resources of the resource optimisation system.

49. A system according to claim 48, further implemented in at least one server covering one cell of the zone of coverage of the network, so as to optimise, in real time, the resources of the server and of the neighbouring servers in the zone of coverage of the network, where this server thus constitutes a system for optimising the resources of the network.

* * * * *